US010768471B2

(12) United States Patent
Kim et al.

(10) Patent No.: US 10,768,471 B2
(45) Date of Patent: Sep. 8, 2020

(54) LIQUID-CRYSTAL DISPLAY DEVICE AND METHOD OF MANUFACTURING THE SAME

(71) Applicant: Samsung Display Co., Ltd., Yongin-si (KR)

(72) Inventors: Jeong Ki Kim, Hwaseong-si (KR); Jea Heon Ahn, Cheonan-si (KR); Jang Il Kim, Asan-si (KR); Jong Hoon Kim, Seongnam-si (KR); Cheon Jae Maeng, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 87 days.

(21) Appl. No.: 15/921,544

(22) Filed: Mar. 14, 2018

(65) Prior Publication Data

US 2019/0155094 A1 May 23, 2019

(30) Foreign Application Priority Data

Nov. 22, 2017 (KR) ........................ 10-2017-0156209

(51) Int. Cl.
*G02F 1/1335* (2006.01)
*G02F 1/1339* (2006.01)
*G02F 1/1368* (2006.01)
*G02F 1/13357* (2006.01)
*G02F 1/1333* (2006.01)

(52) U.S. Cl.
CPC ...... *G02F 1/133516* (2013.01); *G02F 1/1339* (2013.01); *G02F 1/1368* (2013.01); *G02F 1/133512* (2013.01); *G02F 1/133617* (2013.01); *G02F 1/133528* (2013.01); *G02F 2001/133354* (2013.01); *G02F 2001/133519* (2013.01); *G02F 2001/133521* (2013.01); *G02F 2001/133548* (2013.01); *G02F 2001/133562* (2013.01); *G02F 2001/133565* (2013.01); *G02F 2202/36* (2013.01); *G02F 2203/055* (2013.01)

(58) Field of Classification Search
None
See application file for complete search history.

(56) References Cited

U.S. PATENT DOCUMENTS 8,294,848 B2  10/2012 Cho et al.
9,841,625 B2  12/2017 Kim et al.
(Continued)

FOREIGN PATENT DOCUMENTS

JP   2015-022253     2/2015
KR   10-2005-0019988  3/2005
KR   10-2017-0026822  3/2017

*Primary Examiner* — James A Dudek
(74) *Attorney, Agent, or Firm* — H.C. Park & Associates, PLC

(57) ABSTRACT

A liquid-crystal display device and a method of manufacturing a liquid-crystal display device. The liquid-crystal display device has a display area and a non-display area surrounding the display area defined therein, and the device includes: a first substrate; a second substrate disposed above the first substrate; and a liquid-crystal layer interposed between the first substrate and the second substrate. The first substrate includes a first base substrate, a first wavelength band filter disposed on the first base substrate in the non-display area, and a second wavelength band filter disposed on the first base substrate in the display area.

15 Claims, 22 Drawing Sheets

(56) References Cited

U.S. PATENT DOCUMENTS

2002/0145688 A1* 10/2002 Sekiguchi ......... G02F 1/133555
 349/114
2012/0229740 A1* 9/2012 Tsai .................. G02F 1/133514
 349/106

* cited by examiner

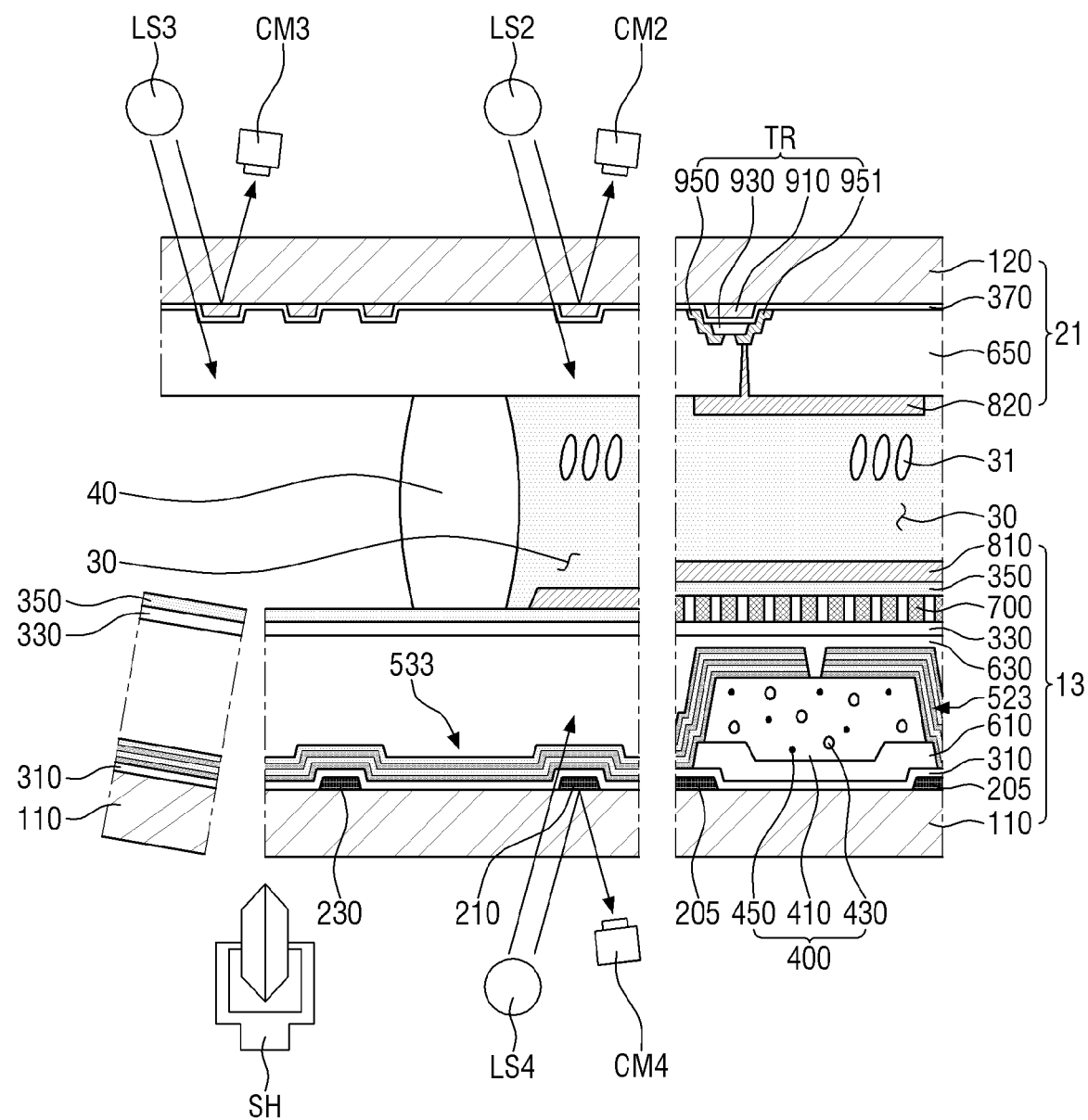

LIQUID-CRYSTAL DISPLAY DEVICE AND METHOD OF MANUFACTURING THE SAME

CROSS REFERENCE TO RELATED APPLICATION

This application claims priority from and the benefit of Korean Patent Application No. 10-2017-0156209, filed on Nov. 22, 2017, which is hereby incorporated by reference for all purposes as if fully set forth herein.

BACKGROUND

Field

Exemplary embodiments of the inventive concepts relate to a liquid-crystal display device and a method of manufacturing the same.

Discussion of the Background

Display devices become more and more important as multimedia technology evolves. Accordingly, a variety of display devices, such as liquid-crystal display (LCD) devices and organic light-emitting diode display (OLED) devices, are currently being developed.

For example, a liquid-crystal display device includes a liquid-crystal display panel including electric field generating electrodes, such as a pixel electrode and a common electrode, and a liquid-crystal layer in which an electric field is formed by the electric field generating electrodes; and a backlight unit for providing light to the liquid-crystal display panel. The liquid-crystal display device displays images by re-aligning liquid crystals in the liquid-crystal layer by using the electric field generating electrodes to thereby control the amount of light passing through the liquid-crystal layer for each pixel.

As a way for allowing each pixel to represent one of primary colors, a color conversion pattern may be disposed in each of the pixels on an optical path from a backlight unit to a viewer.

One example of the color conversion pattern utilizes a wavelength shifter, such as quantum dots. Because the quantum dots emit light in various directions regardless of the incidence angle, a reflector is required to recycle the light emitted in ineffective directions to make it contribute to displaying images. However, such a reflector may produce unwanted reflection of light during the process of manufacturing liquid-crystal display devices, and thus, the processability is deteriorated.

The above information disclosed in this Background section is only for understanding of the background of the inventive concepts, and, therefore, it may contain information that does not constitute prior art.

SUMMARY

Exemplary embodiments of the inventive concepts provide a liquid-crystal display device capable of improving the efficiency of utilizing light.

Exemplary embodiments of the inventive concepts also provide a method of manufacturing a liquid-crystal device with improved processability and efficiency of utilizing light.

Additional features of the inventive concepts will be set forth in the description which follows, and in part will be apparent from the description, or may be learned by practice of the inventive concepts.

An exemplary embodiment of the inventive concepts provides a liquid-crystal display device. The liquid-crystal display device has a display area and a non-display area surrounding the display area defined therein. The device includes: a first substrate; a second substrate disposed above the first substrate; and a liquid-crystal layer interposed between the first substrate and the second substrate. The first substrate includes a first base substrate, a first wavelength band filter disposed on the first base substrate in the non-display area, and a second wavelength band filter disposed on the first base substrate in the display area.

Each of the first wavelength band filter and the second wavelength band filter may be a wavelength-selective reflector, and a reflection wavelength band of the first wavelength band filter may be at least partially different from a reflection wavelength band of the second wavelength band filter.

Each of the first wavelength band filter and the second wavelength band filter may include a plurality of inorganic layers stacked on one another alternately. A total thickness of the first wavelength band filter may be different from a total thickness of the second wavelength band filter, and the first wavelength band filter and the second wavelength band filter may share at least a part of the inorganic layers.

The first substrate may further include an overcoating layer disposed on the first wavelength band filter and the second wavelength band filter. Each of the first wavelength band filter and the second wavelength band filter may include a first inorganic layer and a second inorganic layer stacked on one another alternately, the second inorganic layer having a refractive index smaller than a refractive index of the first inorganic layer.

A topmost layer of the first wavelength band filter in contact with the overcoating layer may be the second inorganic layer, and a topmost layer of the second wavelength band filter in contact with the overcoating layer may be the first inorganic layer.

The second substrate may include a second base substrate and a first color filter pattern disposed on the second base substrate and overlapping with the first wavelength band filter. A reflection wavelength band of the first wavelength band filter may at least partially overlap with an absorption wavelength band of the first color filter pattern.

The second substrate may further include a thin-film transistor disposed in the display area on the second base substrate; and a second color filter pattern disposed on the thin-film transistor, overlapping with the thin-film transistor, and having a same transmission wavelength band as that of the first color filter pattern.

The first substrate may further include an alignment key pattern overlapping with the first wavelength band filter and the first color filter pattern, The reflection wavelength band of the first wavelength band filter may be substantially the same as the reflection wavelength band of the second wavelength band filter.

The liquid-crystal display device may further include a sealing member that attaches the first substrate and the second substrate together and is disposed in the non-display area. The first substrate may further include a first alignment key pattern disposed on the first base substrate in the non-display area and is disposed on an inner side of the sealing member, and the second substrate may include a second alignment key pattern at least partially overlapping with the first alignment key pattern on the second base substrate.

The first substrate may further include a light-blocking pattern disposed in the display area on the first base substrate, disposed on a boundary between adjacent pixels and including a same material as the first alignment key pattern.

The first substrate may further include a third alignment key pattern disposed on the first base substrate in the non-display area and disposed on an outer side of the sealing member.

The second substrate may further include a fourth alignment key pattern disposed on the second base substrate in the non-display area, disposed on the outer side of the sealing member, and aligned with the third alignment key pattern.

An area of the second substrate may be larger than an area of the first substrate when viewed from a top, and the second substrate may further include a fifth alignment key pattern that does not overlap with the first substrate and includes a same material as the second alignment key pattern.

The first substrate may further include a color conversion pattern disposed between the first base substrate and the second wavelength band filter, overlapping with the second wavelength band filter, and in contact with the second wavelength band filter. The second wavelength band filter may have an opening partially exposing the color conversion pattern, and the second wavelength band filter may include a plurality of inorganic layers stacked on one another, and side surfaces of the inorganic layers may be exposed through the opening.

Another exemplary embodiment of the inventive concepts provides a liquid-crystal display device. The liquid-crystal display device has a display area and a non-display area surrounding the display area defined therein. The device includes a first substrate; a second substrate disposed above the first substrate; and a liquid-crystal layer interposed between the first substrate and the second substrate. The first substrate includes a base substrate, a color conversion pattern disposed on the base substrate in the display area, a wavelength-selective reflector disposed on the color conversion pattern, and an alignment key pattern disposed on the base substrate in the non-display area. The wavelength-selective reflector does not overlap with the alignment key pattern.

The liquid-crystal display device may further include a sealing member that attaches the first substrate and the second substrate, is disposed in the non-display area, and partially overlaps with the wavelength-selective reflector.

Another exemplary embodiment of the inventive concepts provides a method of manufacturing a liquid-crystal display device. The method includes: forming an alignment key pattern on a base substrate; forming a first wavelength-selective reflector on the alignment key pattern, the first wavelength-selective reflector including a plurality of layers stacked on one another alternately each having a different refractive index; and partially patterning a portion of the first wavelength-selective reflector overlapping with the alignment key pattern.

The partially patterning may include removing the portion of the first wavelength-selective reflector overlapping with the alignment key pattern.

The partially patterning may include forming a second wavelength-selective reflector by reducing a thickness of the first wavelength-selective reflector. The second wavelength-selective reflector may have a reflection wavelength band different from that of the first wavelength-selective reflector.

The method may further include: forming a color conversion pattern on the base substrate prior to the forming the first wavelength-selective reflector; and partially patterning a portion of the first wavelength-selective reflector overlapping with the color conversion pattern, after the forming the first wavelength-selective reflector. The patterning the portion overlapping with the alignment key pattern and the patterning the portion overlapping with the color conversion pattern may be performed simultaneously.

The method may further include: providing a sealing member on a first substrate comprising the base substrate, the alignment key pattern and the first wavelength-selective reflector; and aligning the first substrate with a second substrate including a thin-film transistor and attaching the first substrate and the second substrate together using the sealing member. The alignment key pattern may include a first alignment key pattern disposed on an outer side of the sealing member, and the second substrate may further include a second alignment key pattern disposed on the outer side of the sealing member.

The aligning the first substrate with the second substrate may include irradiating light from a side of the second alignment key pattern, and sensing the light transmitted toward a side of the first alignment key pattern to check alignment between the first substrate and the second substrate.

The method may further include: checking positional relationship between the first substrate and the second substrate attached together by the sealing member, and partially removing the first substrate. The alignment key pattern may further include a third alignment key pattern disposed on an inner side of the sealing member. The second substrate may further include a fourth alignment key pattern partially overlapping with the third alignment key pattern and a fifth alignment key pattern not overlapping with the first substrate.

The checking the positional relationship between the first substrate and the second substrate may include at least one of: irradiating light toward the third alignment key pattern to sense light reflected off the third alignment key pattern, irradiating light toward the fourth alignment key pattern to sense light reflected off the fourth alignment key pattern, and irradiating light toward the fifth alignment key pattern to sense light reflected off the fifth alignment key pattern.

According to exemplary embodiments of the inventive concepts, a liquid-crystal display device can improve the efficiency of utilizing light by recycling at least a part of the light emitted from a color conversion pattern in different directions to make it contribute to displaying images.

According to exemplary embodiments of the inventive concepts, a method of manufacturing a liquid-crystal display device can suppress unwanted reflection of light near an alignment key, to thereby improve the processibility.

Additional features of the inventive concepts will be set forth in the description which follows, and in part will be apparent from the description, or may be learned by practice of the inventive concepts.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 17, FIG. 18, FIG. 19, FIG. 20, FIG. 21, and FIG. 22 are cross-sectional views for illustrating processes of a method of manufacturing a liquid-crystal display device according to another exemplary embodiment of the inventive concepts.

DETAILED DESCRIPTION OF THE ILLUSTRATED EMBODIMENTS

Figure 1:
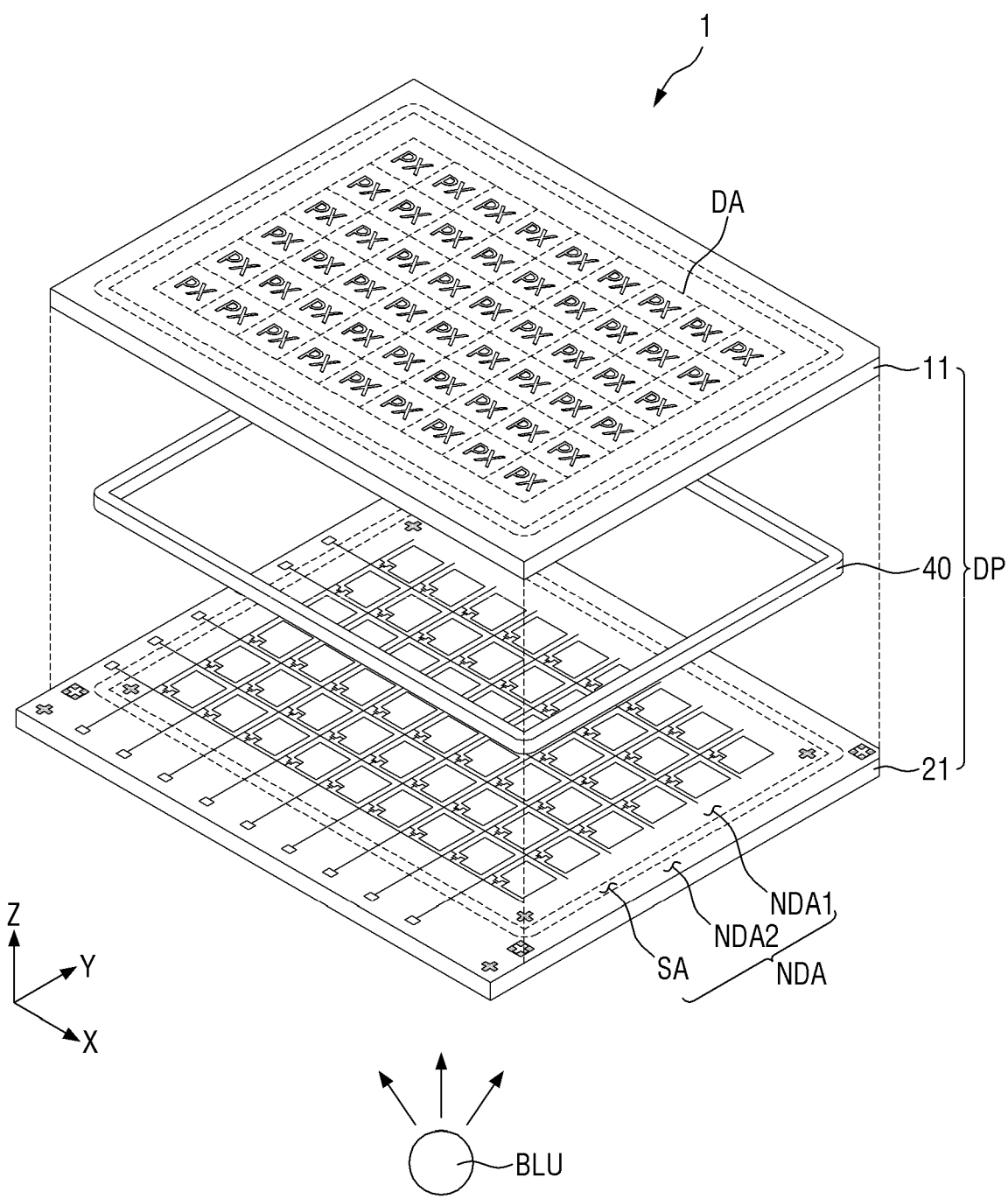
FIG. 1 is an exploded, perspective view of a liquid-crystal display device according to an exemplary embodiment of the inventive concepts.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is an exploded, perspective view of a liquid-crystal display device according to an exemplary embodiment of the inventive concepts.

Referring to FIG. 1, a liquid-crystal display device 1 includes a liquid-crystal display panel DP and a backlight unit BLU.

On the liquid-crystal display panel DP 110, a display area DA and a non-display area NDA may be defined. The display area DA includes a plurality of pixels PX that transmit light to actually display images. As used herein, a "pixel" refers to a single area defined by dividing the display area DA into sub-areas for displaying images or colors when viewed from the top. A single pixel may represent a predetermined one of primary colors. That is, a single pixel may be a minimum unit that can represent a color independently of another pixel. The primary colors may include, but is not limited to, red, green and blue. The plurality of pixels PX may be arranged repeatedly in the first direction X and the second direction Y to form a substantially matrix when viewed from the top (i.e., in a plan view). In the following description, the "plane" refers to the xy-plane defined by two lines extended in the first direction X and the second direction Y, respectively.

When viewed from the top the display area DA may be surrounded by the non-display area NDA. The non-display area NDA does not contribute to displaying images. In the non-display area NDA, elements required for driving the liquid-crystal display device 1, such as a pad unit, driving circuitry and a sealing member 40 may be disposed. In some embodiments, the non-display area NDA may include a sealing area SA in which the sealing member 40 is disposed, a first non-display area NDA1 disposed on the inner side of the sealing area SA (i.e., closer to the display area DA), and a second non-display area NDA2 disposed on the outer side of the sealing area SA. For example, the first non-display area NDA1 may surround the display area DA when viewed from the top. In addition, the sealing area SA may surround the first non-display area NDA1 when viewed from the top. In addition, the second non-display area NDA2 may surround the sealing area SA when viewed from the top.

The backlight unit BLU may be disposed below the liquid-crystal display panel DP to emit light having a certain wavelength toward the liquid-crystal display panel DP. In an exemplary embodiment, the backlight unit BLU may be an edge-lit backlight assembly that includes a light source (not shown) emitting light and a light-guide plate (not shown) guiding the light provided from the light source toward the liquid-crystal display panel DP.

The light source may be a light-emitting diode (LED), an organic light-emitting diode (OLED), a laser diode (LD), or the like. In an exemplary embodiment, the light source may emit blue light having a single peak wavelength in the range of approximately 430 to 470 nm. In another exemplary embodiment, the light source may emit light in the ultraviolet wavelength band or may emit white light.

The material of the light-guide plate is not particularly limited as long as it has high light transmittance. For example, light-guide plate may be made of a glass material, a quartz material, or a plastic material such as polyethylene terephthalate, polymethylmethacrylate and polycarbonate. In another exemplary embodiment, the light-guide plate may be eliminated, and the backlight unit BLU may be a direct-lit backlight assembly, including a direct light source.

Although not shown in the drawings, one or more optical sheets (not shown) may be further disposed between the liquid-crystal display panel DP and the backlight unit BLU. The optical sheets may include one or more of a prism sheet, a diffusion sheet, a (reflective) polarizing sheet, a lenticular lens sheet, and a micro lens sheet. The optical sheet can improve the display quality of the liquid-crystal display device 1 by modulating optical characteristics of the light provided from the backlight unit BLU and traveling toward the display panel DP, such as condensation, diffusion, scattering, or polarization characteristics Hereinafter, the liquid-crystal display panel DP will be described in detail with reference to FIG. 2 and FIG. 5.

Figure 2:
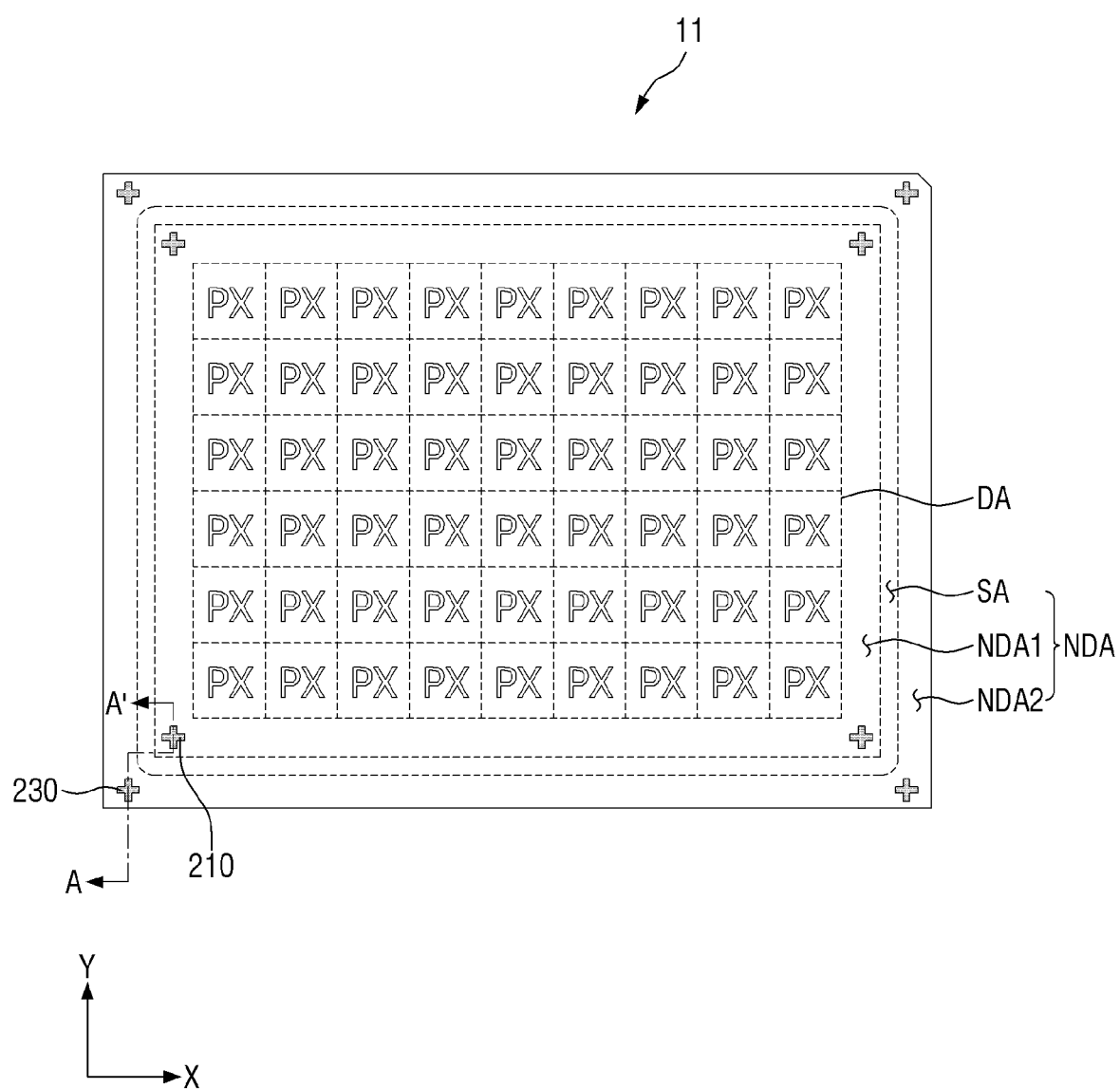
FIG. 2 is a layout diagram of a upper substrate of FIG. 1.
Figure 3:
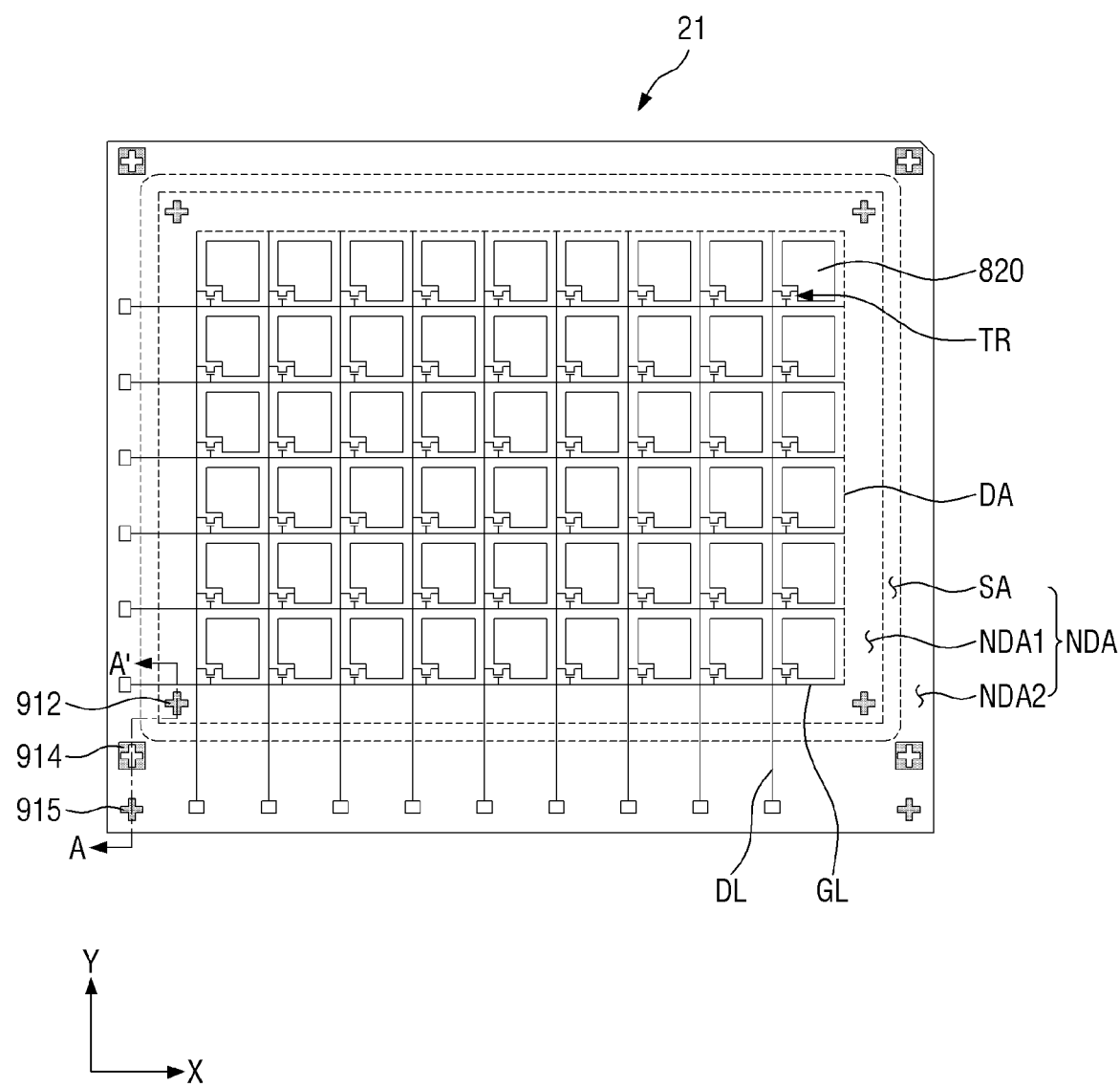
FIG. 3 is a layout diagram of a lower substrate of FIG. 1.
Figure 4:
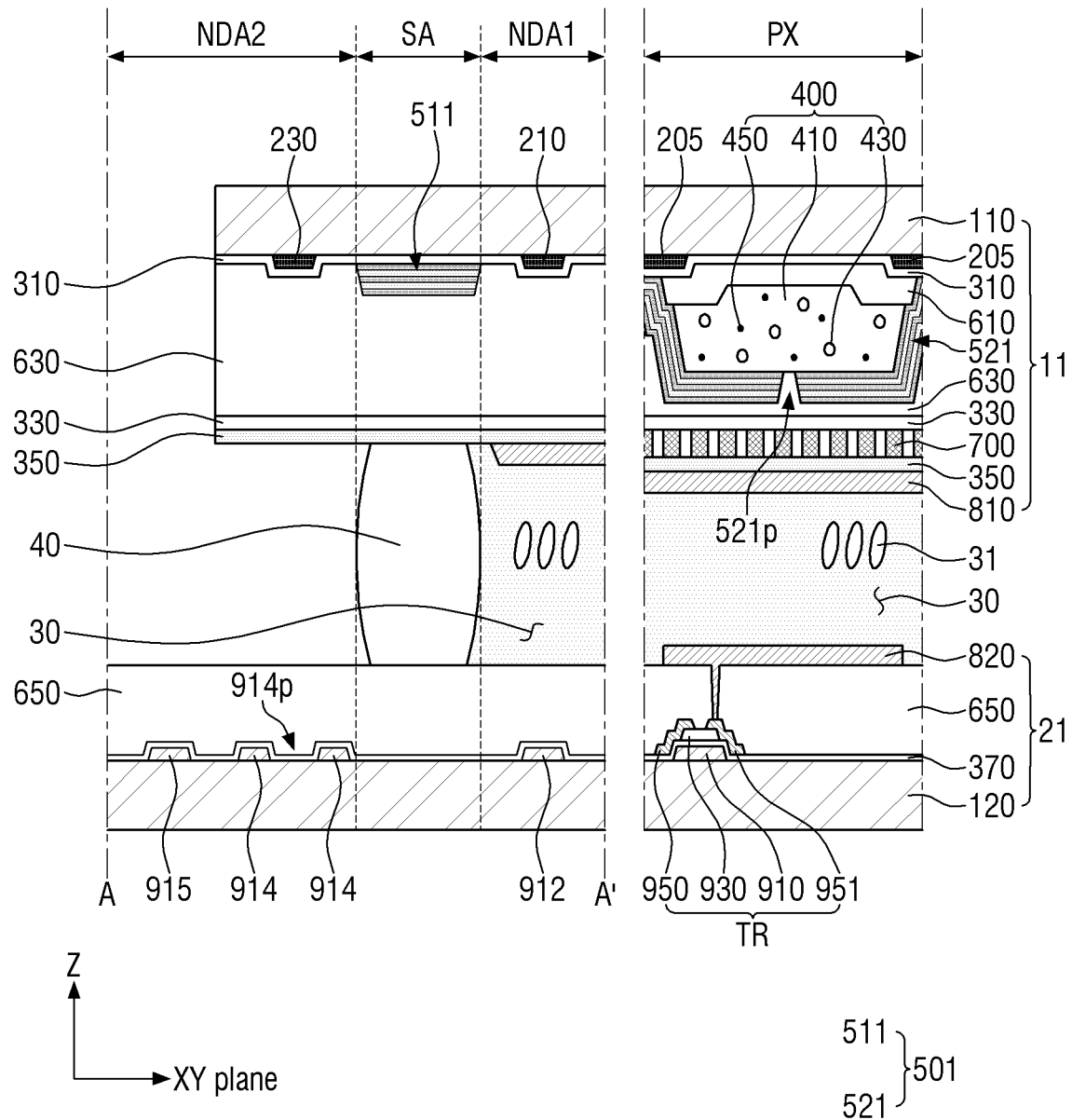
FIG. 4 is a cross-sectional view taken along line A-A' in FIGS. 1 and 2 and a pixel.
Figure 5:
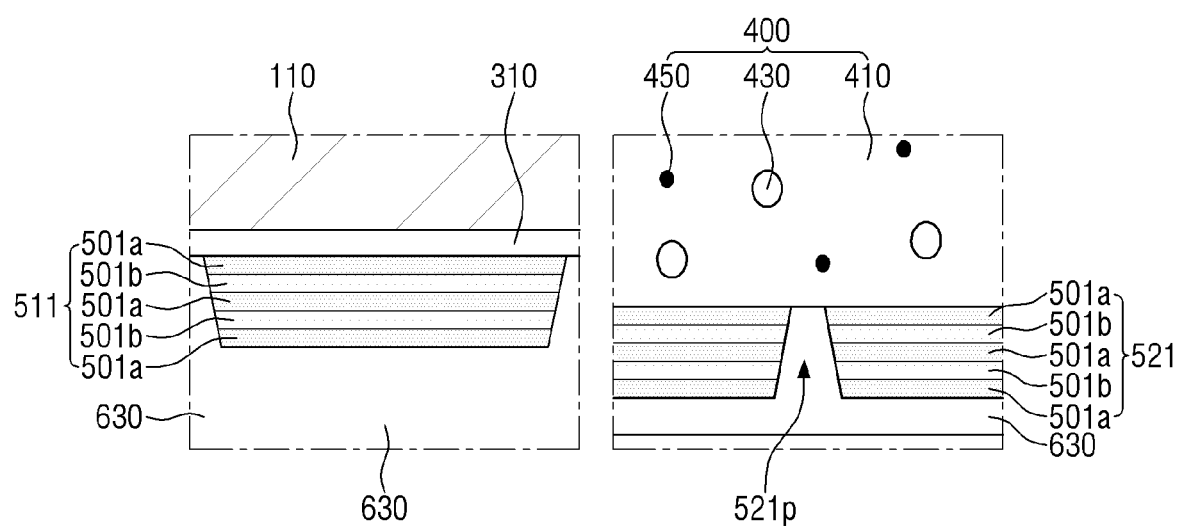
FIG. 5 is an enlarged view showing a first wavelength band filter and a second wavelength band filter of FIG. 4.

FIG. 2 is a layout diagram of an upper substrate 11 of the liquid-crystal display device of FIG. 1, showing a plurality of alignment keys 210 and 230 disposed in the non-display area NDA. FIG. 3 is a layout diagram of a lower substrate 21 of the liquid-crystal display device of FIG. 1, showing a plurality of alignment keys 912, 914, and 915 disposed in the non-display area NDA and a pixel electrode 820 disposed in the display area DA. FIG. 4 is a cross-sectional view of a pixel PX, taken along line A-A' in FIGS. 1 and 2. FIG. 5 is an enlarged view showing a first wavelength band filter 511 and a second wavelength band filter 521 of FIG. 4.

Referring to FIG. 1 to FIG. 5, the liquid-crystal display panel DP may include the upper substrate 11, the lower substrate 21 opposed to the upper substrate 11, the liquid-crystal layer 30 disposed between the upper substrate 11 and the lower substrate 21, and, the sealing member 40 for attaching the upper substrate 11 and the lower substrate 21 together. In some embodiments, the area of the lower substrate 21 may be larger than the area of the upper substrate 11. For example, the length of the lower substrate 21 in the second direction Y may be, but is not limited to, greater than the length of the upper substrate 11 in the second direction Y.

The liquid-crystal layer 30 may be sealed by the upper substrate 11, the lower substrate 21 and the sealing member 40 and may be disposed among them. For example, the liquid-crystal layer 30 may be disposed in the display area DA and the first non-display area NDA1.

The upper substrate 11 will be described first. The upper substrate 11 may include an upper base substrate 110, a color conversion pattern 400, and a wavelength band filter 501 and may further include a first alignment key pattern 210.

The upper base substrate 110 may be a transparent insulating substrate or a transparent insulating film. For example, the upper base substrate 110 may include a glass material, a quartz material, or a translucent plastic material. In some embodiments, the upper base substrate 110 may be flexible, and the liquid-crystal display device 1 may be a curved liquid-crystal display device.

A light-blocking pattern 205 may be disposed on the back surface (the lower surface in FIG. 4) of the upper base substrate 110. The light-blocking pattern 205 may be disposed in the display area DA. Specifically, the light-blocking pattern 205 may be disposed in the boundary between adjacent pixels PX when viewed from the top and can prevent color mixing defects between them. For example, the light-blocking pattern 205 may have a substantially lattice-like shape having openings corresponding to the pixels PX when viewed from the top. The light-blocking pattern 205 may include an opaque metal material, such as chromium, or may include a colorant, such as a black pigment or a black dye, to block light.

The first alignment key pattern 210 may be disposed in the non-display area NDA on the back surface of the upper base substrate 110. For example, the first alignment key pattern 210 may be disposed in the first non-display area NDA1. Specifically, the first alignment key pattern 210 may be disposed more toward the inside than the sealing member 40 and may overlap with the liquid-crystal layer 30 in the third direction Z. When the liquid-crystal display panel DP has a substantially rectangular shape when viewed from the top, the first alignment key pattern 210 may be positioned in the vicinity of each of the corners in the first non-display area NDA1.

The first alignment key pattern 210 may be a feature-specific pattern having a generally '+' shape when viewed from the top. The first alignment key pattern 210 may be used for checking alignment of the upper base substrate 110 and the like when viewed from the top during the process of manufacturing the liquid-crystal display device 1. The first alignment key pattern 210 may be disposed on the same layer as the light-blocking pattern 205. For example, the first alignment key pattern 210 may include the same material as the light-blocking pattern 205 and may be formed simultaneously through a single process.

In some embodiments, a first protective layer 310 may be disposed on the light-blocking pattern 205 and the first alignment key pattern 210. The first protective layer 310 may be a single layer of inorganic material. Examples of the inorganic material include silicon oxide, silicon nitride, silicon oxynitride, etc. The first protective layer 310 may prevent damage or corrosion of the light-blocking pattern 205 and the first alignment key pattern 210. The first protective layer 310 may come in contact with the upper base substrate 110, the light-blocking pattern 205, and the first alignment key pattern 210. In another exemplary embodiment, the first protective layer 310 may be eliminated.

The color conversion pattern 400 may be disposed on the first protective layer 310. The color conversion pattern 400 may convert the color of incident light so that the color of the transmitted light is different from it. That is, the incident light can be converted into light in a predetermined wavelength band after it passes through the color conversion pattern 400. In an exemplary embodiment, the color conversion pattern 400 may include a base resin 410, and a wavelength shifter 430 dispersed in the base resin 410, and may further include a scattering substance 450 dispersed in the base resin 410.

The base resin 410 is not particularly limited as long as it has a high light transmittance and exhibits excellent dispersion characteristics for the wavelength shifter 430 and scattering substance 450. For example, the base resin 410 may be made of an organic material such as an epoxy resin, an acrylic resin, a cardo resin, or an imide resin.

The wavelength shifter 430 may convert or shift the peak wavelength of the incident light to another peak wavelength. The wavelength shifter 430 may be in a particulate form. Examples of the wavelength shifter 430 may include quantum dots, quantum rods, or phosphors. For example, a quantum dot can emit a color as an electron transition from conduction band to valence band. The quantum dot material may have a core-shell structure. The core may be semiconductor nanocrystalline material. Examples of the core of the quantum dots may include, but is not limited to, silicon (Si) nanocrystals, II-VI group compound nanocrystals, and III-V group compound nanocrystals, etc. As a non-limiting example, the wavelength shifter 430 may include a core made of cadmium selenide (CdSe), cadmium telluride (CdTe), cadmium sulfide (CdS) or indium phosphide (InP), and an outer shell made of zinc sulfide (ZnS).

As a non-limiting example, the wavelength shifter 430 of the color conversion pattern 400 disposed in a green pixel may absorb at least a part of light provided from the backlight unit BLU, e.g., blue light, and may emit green light having a peak wavelength in the range of approximately 530 nm to 570 nm. By doing so, the light may represent green after passing through the color conversion pattern 400. Or, the wavelength shifter 430 of the color conversion pattern 400 disposed in a red pixel may absorb at least a part of light provided from the backlight unit BLU and may emit red light having a peak wavelength in the range of approximately 610 nm to 650 nm. By doing so, the light may represent red after passing through the color conversion pattern 400. The light emitted by the wavelength shifter 430 is emitted in several directions irrespective of the incidence angle, and can contribute to improving the side visibility of the green pixel and/or the red pixel of the liquid-crystal display device 1.

The scattering substance 450 may have a refractive index different from that of the base resin 410 and may form an optical interface with the base resin 410. For example, the scattering substance 450 may be light scattering particles. The material of the scattering substance 450 is not particularly limited as long as they can scatter at least a part of the transmitted light. For example, the scattering substance 450 may be metal oxide particles or organic particles. Examples of the metal oxide may include titanium oxide ($TiO_2$), zirconium oxide ($ZrO_2$), aluminum oxide ($Al_2O_3$), indium oxide ($In_2O_3$), zinc oxide (ZnO), tin oxide ($SnO_2$) and the like. The scattering substance 450 can scatter light in various directions regardless of the incidence angle without substantially changing the wavelength of the light passing through the color conversion pattern 400. By doing so, the length of the path in which the light passes through the color conversion pattern 400 can be increased, and the color conversion efficiency by the wavelength shifter 430 can be increased.

In some embodiments, a color filter pattern 610 may be disposed between the first protective layer 310 and the color conversion pattern 400. Herein, "color filter" refers to a wavelength-selective optical filter that transmits light of a particular wavelength band and absorbs light of other wavelength bands to thereby transmit only a part of the wavelength bands. The color filter pattern 610 may overlap with the color conversion pattern 400. In an exemplary embodiment, the color filter pattern 610 may block transmission of light in the blue wavelength band including the peak wavelength of blue, and may transmit light having a peak wavelength longer than blue, for example, light in the green wavelength band including the peak wavelength of green and/or the red wavelength band including the peak wavelength of red. For example, the color filter pattern 610 may include a base resin, and a colorant such as pigment or dye dispersed or dissolved in the base resin. The color filter pattern 610 may block some of the light provided from the backlight unit BLU to be incident on the color conversion pattern 400, e.g., some of blue light that is not absorbed or color-converted by the wavelength shifter 430 of the color conversion pattern 400 but passed through the base resin 420 of the color conversion pattern 400. In this manner, the spectrums of the green color reproduced by a green pixel and/or the red color reproduced by a red pixel can become sharper, such that the color purity and display quality of the liquid-crystal display device 1 can be improved.

The wavelength band filter 501 may be disposed on the color conversion pattern 400. The wavelength band filter 501 may be a wavelength-selective optical filter that selectively transmits only a part of the wavelength bands. For example, the wavelength band filter 501 may be a wavelength-selective reflector that transmits light of a particular wavelength band and reflects light of other wavelength bands.

In an exemplary embodiment, the wavelength band filter 501 may be a distributed Bragg reflector that transmits light in the blue wavelength band including a peak wavelength of blue and selectively reflects light having a wavelength longer than blue light, e.g., light in the green wavelength band including a peak wavelength of green and/or light in the red wavelength band including a peak wavelength of red.

The wavelength band filter 501 may include a plurality of layers 501a and 501b stacked on one another. For example, the wavelength band filter 501 may include at least one first inorganic layer 501a and at least one second inorganic layer 501b alternately stacked on one another. The second inorganic layer 501b may have a refractive index smaller than that of the first inorganic layer 501a and may be made of a material different from that of the first inorganic layer 501a. For example, when the wavelength band filter 501 is a stack of an odd number of layers, the bottom layer (uppermost layer in FIG. 4) and the topmost layer (lowermost layer in FIG. 4) of the wavelength band filter 501 may be made of the same material. As a non-limiting example, each of the bottom layer of the wavelength band filter 501 in contact with the color conversion pattern 400 and the topmost layer of the wavelength band filter 501 in contact with the overcoating layer 630 may be the first inorganic layer 501a having a relatively high refractive index. The first inorganic layer 501a may be, but is not limited to, a silicon nitride layer, and the second inorganic layer 501b may be, but is not limited to, a silicon oxide layer. The transmission wavelength band and the reflection wavelength band of the wavelength band filter 501 may be controlled by a difference in the refractive index and a difference in the thickness between the first inorganic layer 501a and the second inorganic layer 501b and/or the number of layers of the first inorganic layer 501a and the second inorganic layer 501b and the like.

Although the wavelength band filter 501 shown in FIGS. 4 and 5 is a stack of five layers, this is merely illustrative. The wavelength band filter 501 may be a stack of ten layers, eleven layers, twelve layers, thirteen layers, fourteen layers, or fifteen layers. In addition, although the wavelength band filter 501 shown in FIG. 4 and the like is a stack of an odd number of layers, the wavelength band filter 501 may be a stack of an even number of layers in other exemplary embodiments.

The wavelength band filter 501 may include the first wavelength band filter 511 disposed in the non-display area NDA, and the second wavelength band filter 521 disposed in the pixel PX in the display area DA. Although the first wavelength band filter 511 and the second wavelength band filter 521 are shown as being spaced from each other in the cross-sectional view of FIG. 4, the first wavelength band filter 511 and the second wavelength band filter 521 may be physically connected with each other in another cross-section of the liquid-crystal display device 1 according to an exemplary embodiment of the inventive concepts. That is, the first wavelength band filter 511 and the second wavelength band filter 521 may share at least a part of the first inorganic layer 501a and/or the second inorganic layer 501b. In other words, the first inorganic layer 501a of the first wavelength band filter 511 and the first inorganic layer 501a of the second wavelength band filter 521 may be physically connected with each other, and the second inorganic layer 501b of the first wavelength band filter 511 and the second inorganic layer 501b of the second wavelength band filter 521 may be physically connected with each other.

First, the second wavelength band filter 521 may be disposed in the pixel PX and may at least partially overlap with the color conversion pattern 400. The second wavelength band filter 521 may be disposed across a blue pixel, a green pixel, and/or a red pixel. In addition, the second wavelength band filter 521 may come in contact with the color conversion pattern 400. The second wavelength band filter 521 may reflect some of the green or red light emitted by the wavelength shifter 430 in the color conversion pattern 400 in various directions that are emitted toward the upper base substrate 110 (downward in FIG. 4) toward the upper base substrate 110, that is, a viewer (upward in FIG. 4), so as to contribute to the color display. By doing so, the efficiency of utilizing of light can be increased, and display quality such as brightness and color purity of the liquid-crystal display device 1 can be improved.

In some embodiments, the second wavelength band filter 521 may be disposed to surround the color conversion pattern 400, and may have an opening 521p that partially exposes the color conversion pattern 400. It is, however, to be understood that this is merely illustrative. For example, when the second wavelength band filter 521 is formed after the color conversion pattern 400 is formed and a subsequent process is performed, the opening 521p of the second wavelength band filter 521 may provide a passage through which gas generated in the color conversion pattern 400 exits. That is, by forming the opening 521p for partially exposing the color conversion pattern 400, it is possible to facilitate outgassing and to suppress the process failure and the poor display quality of the liquid-crystal display device 1 caused thereby. Side surfaces of the plurality of layers 501a and 501b of the second wavelength band filter 521, e.g., a side surface of the first inorganic layer 501a and a side surface of the second inorganic layer 501b may be exposed via the opening 521p, and may be in contact with the overcoating layer 630, which will be described later.

The first wavelength band filter 511 may be disposed in the non-display area NDA. The first wavelength band filter 511 may have substantially the same reflection wavelength band as the second wavelength band filter 521. For example, the total thickness of the first wavelength band filter 511 may be substantially equal to the total thickness of the second wavelength band filter 521. In addition, the number of layers of the first wavelength band filter 511 may be equal to the number of layers of the second wavelength band filter 521. It is, however, to be understood that this is merely illustrative. The reflection wavelength band of the first wavelength band filter 511 may be partially different from that of the second wavelength band filter 521.

In some embodiments, the first wavelength band filter 511 may be disposed such that it does not overlap with the first alignment key pattern 210 in the third direction Z. For example, the first alignment key pattern 210 may be disposed in the first non-display area NDA1 to overlap with the liquid-crystal layer 30, and the first wavelength band filter 511 may be partially disposed in the sealing area SA to overlap with the sealing member 40. That is, the first alignment key pattern 210 and the first wavelength band filter 511 may be spaced apart from each other in the plane direction (the first direction X and/or the second direction Y).

As mentioned earlier, the first alignment key pattern 210 may be used for checking alignment of the upper base substrate 110 and the like when viewed from the top during the process of manufacturing the liquid-crystal display device 1. For example, when the alignment state is checked using light, by disposing the first alignment key pattern 210 for blocking light transmission and the first wavelength band filter 511 for partially reflecting light such that they do not overlap with each other, it is possible to prevent a defect in which the location of the first alignment key pattern 210 is not seen at all or is not clearly seen and thus, the alignment state cannot be properly checked.

The overcoating layer 630 may be disposed on the wavelength band filter 501. The overcoating layer 630 may come in contact with both the first wavelength band filter 511 and the second wavelength band filter 521. The overcoating layer 630 may be used to partially fill the opening 521p of the second wavelength band filter 521 and may come in contact with the color conversion pattern 400.

The overcoating layer 630 may reduce a level difference created by the elements disposed on the upper base substrate 110, e.g., the color conversion pattern 400. That is, the overcoating layer 630 may be a particle cover layer or a planarization layer. The overcoating layer 630 may be disposed across the display area DA and the non-display area NDA. The overcoating layer 630 is not particularly limited as long as it is a material having excellent planarization characteristics and light transmittance. For example, the overcoating layer 630 may include an organic material, such as an epoxy resin, an acrylic resin, an imide resin, a cardo resin, a siloxane resin, and a silsesquioxane resin.

In some embodiments, a second protective layer 330 may be disposed on the overcoating layer 630. The second protective layer 330 may include a non-metallic inorganic material. Examples of the inorganic material for forming the second protective layer 330 include silicon oxide, silicon nitride, silicon oxynitride and the like. The second protective layer 330 may protect the overcoating layer 630 from being damaged during the process of forming a wire grid pattern 700 to be described later. Although not limiting, when the wire grid pattern 700 is formed through a dry etching process, the second protective layer 330 serves as an etch stopper, thereby preventing the overcoating layer 630 from being undesirably etched. In addition, the wire grid pattern 700 can be reliably attached to the overcoating layer 630 made of an organic material and damage or corrosion of the wire grid pattern 700 due to permeation of impurities such as air or moisture can be prevented, such that the durability and reliability of the liquid-crystal device 1 can be improved. In another exemplary embodiment, the second protective layer 330 may be eliminated, and the wire grid pattern 700 may be disposed directly on the overcoating layer 630.

The wire grid pattern 700 may be disposed on the second protective layer 330. The wire grid pattern 700 may serve as a polarizing element performing an optical shutter function together with the liquid-crystal layer 30, for example, as an upper polarizing element. In a non-limiting example, the wire grid pattern 700 may be disposed only in the display area DA but not in the non-display area NDA.

In an exemplary embodiment, the wire grid pattern 700 may have reflective polarization characteristics that reflect polarized components oscillating in a direction generally parallel to the extending direction of the wire grid pattern, and transmit the polarized components oscillating in a direction generally to the spacing direction of the wire grid pattern. That is, the wire grid pattern 700 reflects at least a part of the incident light and may impart polarization characteristics to the transmitted light.

The wire grid pattern 700 may include a reflective metal material. Examples of the metal material may include aluminum (Al), silver (Ag), gold (Au), copper (Cu), titanium (Ti), molybdenum (Mo), nickel (Ni), or an alloy thereof. In some embodiments, the wire grid pattern 700 may have a stack structure of a metal material and a non-metallic, inorganic material.

A third protective layer 350 may be disposed on the wire grid pattern 700. The third protective layer 350 may be disposed directly on the wire grid pattern 700 to cover and protect the wire grid pattern 700 and may insulate the wire grid pattern 700 from a common electrode 810 to be described below. The third protective layer 350 can prevent damage or corrosion of the wire grid pattern 700 due to permeation of impurities such as air or moisture, thereby improving durability and reliability of the liquid-crystal display device 1. In addition, the third protective layer 350 may define voids between adjacent wire grid patterns 700. In some embodiments, the third protective layer 350 may have a stack structure. For example, the third protective layer 350 may have a stack structure of an inorganic layer containing an inorganic material and an organic layer containing an organic material. The material of the third protective layer 350 may include, but is not limited to, an inorganic material such as silicon nitride or silicon oxide and/or an organic material such as an epoxy resin, an acrylic resin, an imide resin, a carcass resin, a siloxane resin.

The common electrode 180 may be disposed on the third protective layer 350. The common electrode 810 may be disposed across the plurality of pixels PX as a single piece and may receive a common voltage. The common electrode 810 may be an electric field generating electrode that forms an electric field in the liquid-crystal layer 30 together with the pixel electrode 820 to be described later. The electric field formed by the common electrode 810 and the pixel electrode 820 can re-align the liquid crystals 31 by controlling the behavior of the liquid crystals 31 disposed in the pixel. The common electrode 810 may be made of a transparent conductive material. Examples of the transparent conductive material may include indium tin oxide (ITO), indium zinc oxide (IZO), zinc oxide (ZnO), indium (III) oxide ($In_2O_3$), indium gallium oxide (IGO), or aluminum zinc oxide (AZO).

Next, the lower substrate 21 will be described. The lower substrate 21 is opposed to the upper substrate 11 and may include switching elements. The lower substrate 21 includes a lower base substrate 120, a switching element TR, and a pixel electrode 820, and may further include a second alignment key pattern 912.

Like the upper base substrate 110, the lower base substrate 120 may be a transparent insulating substrate or a transparent insulating film. In some embodiments, the lower base substrate 120 may be flexible. The above-described backlight unit BLU may be disposed on the back surface (lower surface of FIG. 4) of the lower base substrate 120.

The switching element TR may be disposed on the front surface (shown as the upper surface in FIG. 4) of the lower base substrate 120. The switching element TR may be disposed in each of the pixels PX in the display area DA and may transmit or block a driving signal to the pixel electrode 820 to be described later. The switching element TR may be a thin-film transistor that includes a gate 910, an active layer 930 disposed on the gate 910, and a drain 950 and a source 951 spaced apart from each other on the active layer 930.

A control terminal (e.g., the gate 910) may be electrically connected to a gate line GL to receive a gate driving signal. The gate 910 and the gate line GL may be disposed on the same layer. For example, the gate 910 and the gate line GL may include the same material and may be formed simultaneously through a single process.

In addition, an input terminal (e.g., the drain 950) may be electrically connected to a data line DL to receive a data driving signal, and an output terminal (e.g., the source 951) may be electrically connected to the pixel electrode 820. The drain 950 and the source 951 and the data line DL may be disposed on the same layer. For example, the drain 950, the source 951 and the data line DL include the same material and may be formed simultaneously through a single process.

The active layer 930 may include a silicon-based semiconductor material such as amorphous silicon, polycrystalline silicon and monocrystalline silicon, or may include an oxide semiconductor or the like. The active layer 930 may at least partially overlap with the gate 910 in the third direction Z. The active layer 930 acts as a channel of the switching element TR and may turn the channel on or off according to a voltage applied to the gate 910. A gate insulating layer 370 may be disposed between the active layer 930 and the gate 910 to isolate the active layer 930 from the gate 910. The gate insulating layer 370 may be disposed across the display area DA and the non-display area NDA.

In an exemplary embodiment, the second alignment key pattern 912 may be disposed in the non-display area NDA on the front surface of the lower base substrate 120. For example, the second alignment key pattern 912 may be disposed in the first non-display area NDA1. Specifically, the second alignment key pattern 912 may be disposed more toward the inside than the sealing member 40, and the second alignment key pattern 912 may be aligned with the first alignment key pattern 210.

The second alignment key pattern 912 may be a feature-specific pattern having a generally '+' shape when viewed from the top. The second alignment key pattern 912 may have the same shape as or a different shape from the first alignment key pattern 210. In addition, the second alignment key pattern 912 may be in contact with the gate insulating layer 370.

The second alignment key pattern 912 may be used for checking alignment of the lower base substrate 120 and the like from the top view during the process of manufacturing the liquid-crystal display device 1. In some embodiments of the present disclosure, the second alignment key pattern 912 may overlap with the first alignment key pattern 210 in the third direction Z at least partially. Although FIG. 2 and FIG. 3 illustrate that the second alignment key pattern 912 and the first alignment key pattern 210 have the same shape and are completely overlapped, this is merely illustrative.

In addition, the second alignment key pattern 912 may be located on the same layer as the gate 910 and the gate line GL. For example, the second alignment key pattern 912, the gate 910, and the gate line GL may include the same material and may be formed through a single process simultaneously.

An intermediate layer 650 may be disposed over the switching element TR. The intermediate layer 650 is disposed across the plurality of pixels PX to insulate elements thereon from elements thereunder. In addition, the intermediate layer 650 can reduce level differences created by the switching element TR, the gate line GL, the data line DL, and the like. That is, the intermediate layer 650 may be a particle cover layer or a planarization layer. The intermediate layer 650 may include one or more layers. For example, the intermediate layer 650 may include an organic layer made of an organic material, an inorganic layer made of an inorganic material or a stack of an organic layer and an inorganic layer.

The pixel electrodes 820 may be disposed on the intermediate layer 650. The pixel electrodes 810 may be electric field generating electrodes that form an electric field in the liquid-crystal layer 30 together with the pixel electrode 820 described above. The pixel electrodes 820 disposed in each of the pixels PX may be controlled independently of each other and may receive different driving signals. For example, the pixel electrode 820 may be electrically connected to an output terminal (e.g., the source 951) of the switching element TR through a contact hole formed in the intermediate layer 650. The pixel electrode 820 may be made of a transparent conductive material, as is the common electrode 810. Although not shown in the drawings, the pixel electrode 820 may have a domain dividing means. For example, the pixel electrode 820 may have a plurality of fine slits arranged radially when viewed from the top.

The liquid-crystal layer 30 may be disposed between the upper substrate 11 and the lower substrate 21. The liquid-crystal layer 30 may be disposed in a part of the display area DA and the non-display area NDA. For example, the liquid-crystal layer 30 may be disposed in the first non-display area NDA1 and may overlap with the first alignment key pattern 210 and the second alignment key pattern 912 in the third direction Z.

The liquid-crystal layer 30 may include liquid crystals 31 that are initially orientated. As used herein, "liquid crystal" refers to molecules having liquid-crystal characteristics or a collection of such molecules. In an exemplary embodiment, the liquid crystals 31 have negative dielectric anisotropy and their longer axis may be aligned substantially perpendicular to the plane in the initial orientation state. For example, the angle formed by their longer axis of the liquid crystals 31 and the plane may be approximately 80 degrees or more, 85 degrees or more, 86 degrees or more, 87 degrees or more, 88 degrees or more, and may have a pretilt.

In some embodiments, the upper substrate 11 may further include a third alignment key pattern 230, and the lower substrate 21 may further include a fourth alignment key pattern 914 and a fifth alignment key pattern 915.

The third alignment key pattern 230 may be disposed in the non-display area NDA on the back surface of the upper base substrate 110. The third alignment key pattern 230 may be located more toward the outside than the first alignment key pattern 210.

For example, the third alignment key pattern 230 may be disposed in the second non-display area NDA2. Specifically, the third alignment key pattern 230 may be disposed more toward the outside than the sealing member 40 and may not overlap with the liquid-crystal layer 30. When the liquid-crystal display panel DP has a generally rectangular shape when viewed from the top, the third alignment key pattern 230 may be disposed in the vicinity of each of the corners in the second non-display area NDA2. In addition, the third alignment key pattern 230 may be covered by the first protective layer 310.

As in the first alignment key pattern 210, the third alignment key pattern 230 may be a feature-specific pattern having a generally '+' shape when viewed from the top. The third alignment key pattern 230 may have the same shape as or a different shape from the first alignment key pattern 210. The third alignment key pattern 230 may be used for checking alignment of the upper base substrate 110 and the like during the process of manufacturing the liquid-crystal display device 1. The third alignment key pattern 230 may be disposed on the same layer as the first alignment key pattern 210 and the light-blocking pattern 205. For example, the third alignment key pattern 230 may include the same material as the first alignment key pattern 230 and the light-blocking pattern 205 and may be formed through a single process simultaneously.

In addition, a fourth alignment key pattern 914 and a fifth alignment key pattern 915 may be disposed in the non-display area NDA on the front surface of the lower base substrate 120. The fourth alignment key pattern 914 may be located more toward the outside than the second alignment key pattern 912, and the fifth alignment key pattern 915 may be located more toward the outside than the fourth alignment key pattern 914.

For example, the fourth alignment key pattern 914 may be disposed in the second non-display area NDA2. Specifically, the fourth alignment key pattern 914 may be disposed on the outer side of the sealing member 40, and the fourth alignment key pattern 914 may be aligned with the third alignment key pattern 230.

The fourth alignment key pattern 914 may be a feature-specific pattern having an opening generally conforming to the third alignment key pattern 230. For example, the fourth alignment key pattern 914p may have an opening having a generally '+' shape when viewed from the top. In some embodiments, the opening 914p of the fourth alignment key pattern 614 may be larger than the third alignment key pattern 230.

The fifth alignment key pattern 915 may be disposed in the second non-display area NDA2 such that it does not overlap with the upper substrate 11. That is, in an exemplary embodiment where the area of the lower substrate 21 is larger than the area of the upper substrate 11 when viewed from the top, the fifth alignment key pattern 915 may be disposed in the portion of the lower substrate 21 protruding from the upper substrate 11.

The fifth alignment key pattern 915 may be a feature-specific pattern having a generally '+' shape when viewed from the top. The fifth alignment key pattern 915 may have the same shape as or a different shape from the first alignment key pattern 210, the second alignment key pattern 915, and the third alignment key pattern 230.

The fourth alignment key pattern 914 and the fifth alignment key pattern 915 may be in contact with the gate insulating layer 370. The fourth alignment key pattern 914 and the fifth alignment key pattern 915 may be used for checking alignment of the lower base substrate 120 and the like during the process of manufacturing the liquid-crystal display device 1.

In addition, the fourth alignment key pattern 914 and the fifth alignment key pattern 915 may be disposed on the same layer as the second alignment key pattern 912, the gate 910 and the gate line GL. For example, the second alignment key pattern 912, the fourth alignment key pattern 914, the fifth alignment key pattern 915, the gate 910, and the gate line GL may include the same material and may be formed simultaneously through a single process.

In an exemplary embodiment, the first wavelength band filter 511 may be disposed such that it overlaps with none of the third alignment key pattern 230, the fourth alignment key pattern 914, and the fifth alignment key pattern 915 in the third direction Z. That is, each of the third alignment key pattern 230, the fourth alignment key pattern 914, and the fifth alignment key pattern 915 may be spaced apart from the first wavelength band filter 511 in the plane direction.

As mentioned earlier, each of the third alignment key pattern 230, the fourth alignment key pattern 914, and the fifth alignment key pattern 915 may be used to check the alignment state of the upper substrate 11 and/or the lower substrate 11 during the process of manufacturing the liquid-crystal display device 1. By disposing the third alignment key pattern 230, the fourth alignment key pattern 914, and the fifth alignment key pattern 915 such that they do not overlap with the first wavelength band filter 511 that partially reflects the light, it is possible to prevent the problem that the locations of the third alignment key pattern 230, the fourth alignment key pattern 914, and the fifth alignment key pattern 915 are not seen or not clearly seen.

Hereinafter, liquid-crystal display devices according to other exemplary embodiments of the present disclosure will be described. The descriptions of substantially the identical elements as the liquid-crystal display device 1 according to the above-described embodiment will be omitted, which will be clearly understood by those skilled in the art from the accompanying drawings.

Figure 6:
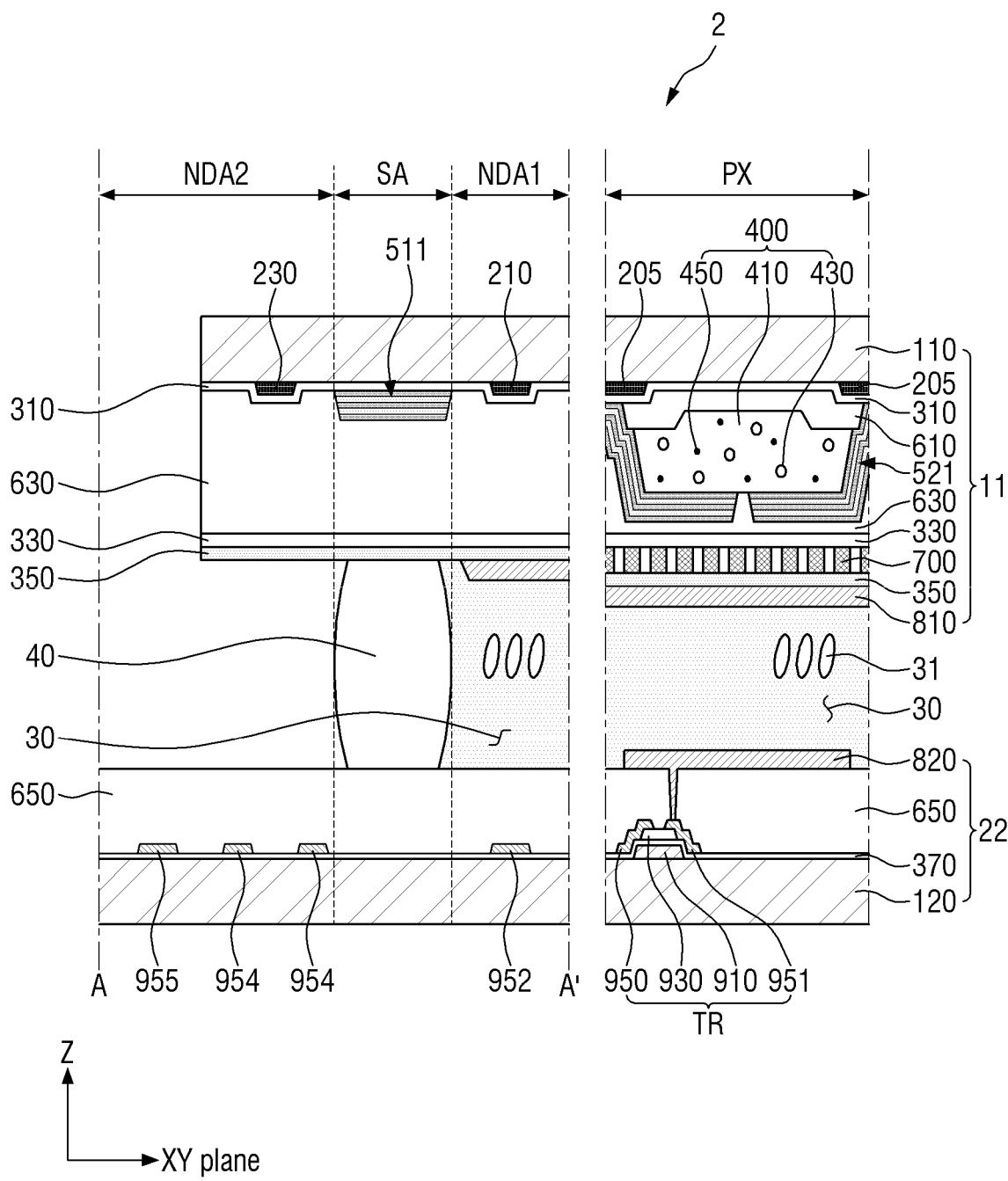
FIG. 6 is a cross-sectional view of a liquid-crystal display device according to another exemplary embodiment of the inventive concepts.

FIG. 6 is a cross-sectional view of a liquid-crystal display device according to another exemplary embodiment of the present disclosure, which corresponds to the cross-sectional view of FIG. 4.

Referring to FIG. 6, the liquid-crystal display device 2 according to this exemplary embodiment is different from the liquid-crystal display device 1 according to the exemplary embodiment shown in FIG. 4 in that the lower substrate 22 of the liquid-crystal display device 2 includes a second alignment key pattern 952 disposed on the gate insulating layer 370.

In an exemplary embodiment, the second alignment key pattern 952 may be disposed in the first non-display area NDA on the front surface of the lower base substrate 120. The second alignment key pattern 952 may be aligned with the first alignment key pattern 210. The second alignment key pattern 952 may be a feature-specific pattern having a generally '+' shape when viewed from the top. The second alignment key pattern 952 may have the same shape as or a different shape from the first alignment key pattern 210. In addition, the second alignment key pattern 952 may be in contact with the gate insulating layer 370 and the intermediate layer 650.

The second alignment key pattern 952 may be disposed on the same layer as a drain 950, a source 951, and a data line (not shown). For example, the second alignment key pattern 952, the drain 950, the source 951 and the data line (not shown) may include the same material and may be formed simultaneously through a single process.

In some embodiments, the lower substrate 22 may further include a fourth alignment key pattern 954 and a fifth alignment key pattern 955. The fourth alignment key pattern 954 and the fifth alignment key pattern 955 may be disposed in the second non-display area NDA2 on the front surface of the lower base substrate 120. For example, the fourth alignment key pattern 954 may be located more toward the outside than the second alignment key pattern 952, and the fifth alignment key pattern 955 may be located more toward the outside than the fourth alignment key pattern 954.

The fourth alignment key pattern 954 may be aligned with the third alignment key pattern 230. The fourth alignment key pattern 954 may be a feature-specific pattern having an opening generally conforming to the third alignment key pattern 230. For example, the fourth alignment key pattern 954p may have an opening having a generally '+' shape when viewed from the top. The fifth alignment key pattern 955 may be disposed in the second non-display area NDA2 such that it does not overlap with the upper substrate 11. The fifth alignment key pattern 955 may be a feature-specific pattern having a generally '+' shape when viewed from the top. Each of the fourth alignment key pattern 954 and the fifth alignment key pattern 955 may be in contact with the gate insulating layer 370 and the intermediate layer 650.

The fourth alignment key pattern 954 and the fifth alignment key pattern 955 may be located on the same layer as the second alignment key pattern 952, the gate 910 and the gate line GL. For example, the second alignment key pattern 952, the fourth alignment key pattern 954, the fifth alignment key pattern 955, the drain 950, the source 951, and the data line (not shown) may include the same material and may be formed through a single process simultaneously.

Figure 7:
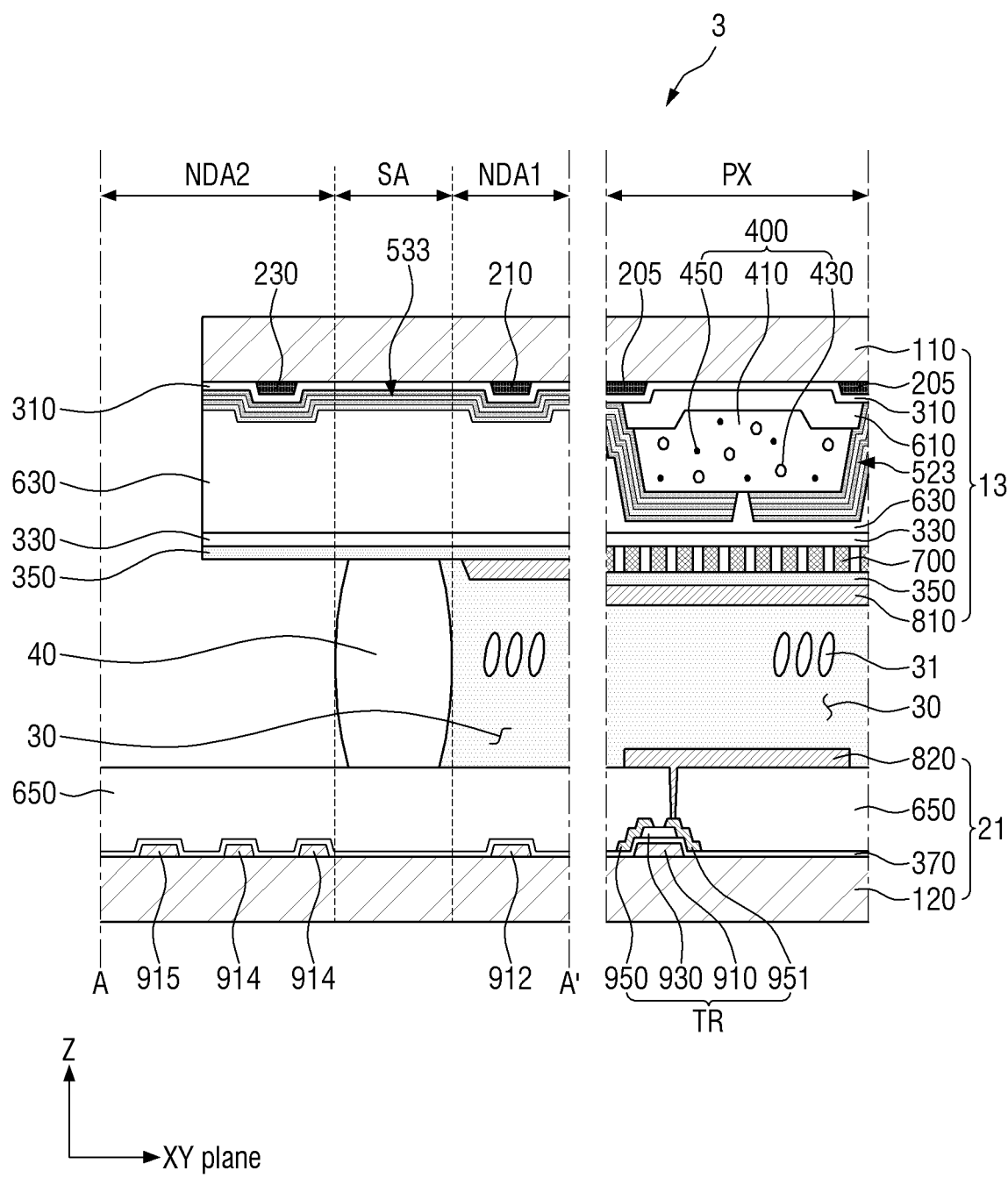
FIG. 7, FIG. 8, and FIG. 9 are cross-sectional views of a liquid-crystal display device according to yet another exemplary embodiment of the inventive concepts.
Figure 8:
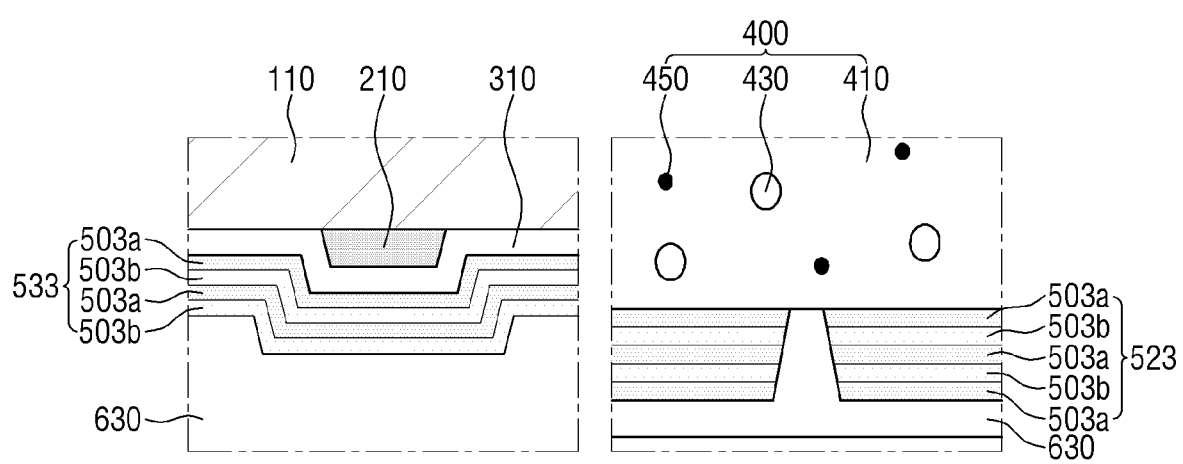

FIG. 7 is a cross-sectional view of a liquid-crystal display device according to yet another exemplary embodiment of the present disclosure, which corresponds to the cross-sectional view of FIG. 4. FIG. 8 is an enlarged view showing a second wavelength band filter 523 and a third wavelength band filter 533 of FIG. 7.

Referring to FIG. 7 and FIG. 8, the liquid-crystal display device 3 according to this exemplary embodiment is different from the liquid-crystal display device 1 according to the exemplary embodiment shown in FIG. 4 and the like in that the reflection wavelength band of the second wavelength band filter 523 is at least partially different from the reflection wavelength band of the third wavelength band filter 533.

In an exemplary embodiment, each of the second wavelength band filter 523 and the third wavelength band filter 533 may include a plurality of layers 503a and 503b stacked one on another. For example, each of the second wavelength band filter 523 and the third wavelength band filter 533 may include at least one first inorganic layer 503a and at least one second inorganic layer 503b alternately stacked one on another. The second inorganic layer 503b has a refractive index smaller than that of the first inorganic layer 503a and may be made of a material different from that of the first inorganic layer 503a.

First, the second wavelength band filter 523 may be disposed in a pixel PX in the display area DA and may at least partially overlap with the color conversion pattern 400. The second wavelength band filter 523 may be disposed across a blue pixel, a green pixel, and/or a red pixel. In addition, the second wavelength band filter 523 may come into contact with the color conversion pattern 400 and the overcoating layer 630.

In an exemplary embodiment, the second wavelength band filter 523 may be a distributed Bragg reflector that transmits light in the blue wavelength band including a peak wavelength of blue and selectively reflects light having a wavelength longer than blue, e.g., light in the green wavelength band including a peak wavelength of green and/or light in the red wavelength band including a peak wavelength of red.

The second wavelength band filter 523 may be a stack of an odd number of layers. In this case, the topmost layer (the uppermost layer in FIG. 7) of the second wavelength band filter 523 may be made of the same material as the topmost layer (the lowermost layer in FIG. 7) of the second wavelength band filter 523. For example, each of the bottom layer of the second wavelength band filter 523 in contact with the color conversion pattern 400 and the topmost layer of the second wavelength band filter 523 in contact with the overcoating layer 630 may be the first inorganic layer 503a having a relatively high refractive index.

In addition, the third wavelength band filter 533 may be partially disposed in the non-display area NDA. For example, the third wavelength band filter 533 may be disposed across the first non-display area NDA1, the sealing area SA, and the second non-display area NDA2. The third wavelength band filter 533 may have a reflection wavelength band at least partially different from the second wavelength band filter 523. In an exemplary embodiment, the total thickness of the third wavelength band filter 533 may be different from the total thickness of the second wavelength band filter 523. For example, the total thickness of the third wavelength band filter 533 may be, but is not limited to, less than the total thickness of the second wavelength band filter 523. In addition, the number of layers of the third wavelength band filter 533 may be less than the number of layers of the second wavelength band filter 523.

In a non-limiting example, the third wavelength band filter 533 may be a stack of an even number of layers. In this case, the topmost layer (the uppermost layer in FIG. 7) of the third wavelength band filter 533 may be made of a different same material from the topmost layer (the lowermost layer in FIG. 7) of the third wavelength band filter 533. For example, the bottom layer of the third wavelength band filter 523 in contact with the first protective layer 310 may be the first inorganic layer 503a having a relatively high refractive index, and the topmost layer of the third wavelength band filter 523 in contact with the overcoating layer 630 may be the second inorganic layer 503b having a relatively low refractive index.

The reflectivity of the third wavelength band filter 533 with respect to the green wavelength band and/or the red wavelength band may be lesser than that of the second wavelength band filter 523 with respect to the green wavelength band and/or the red wavelength band. As a non-limiting example, the second wavelength band filter 523 disposed in the display area DA may completely block the transmission of the green wavelength band and the red wavelength band, while the third wavelength band filter 533 may transmit at least a part of the green wavelength band and/or the red wavelength band.

In some embodiments, the second wavelength band filter 523 and the third wavelength band filter 533 may be physically connected. That is, the second wavelength band filter 523 and the third wavelength band filter 533 may share at least a part of the first inorganic layer 503a and/or the second inorganic layer 503b. For example, one of the first inorganic layers 503a of the second wavelength band filter 523 may be physically connected to one of the first inorganic layers 503a of the third wavelength band filter 533, and one of the second inorganic layers 503b of the second wavelength band filter 523 may be physically connected to one of the second inorganic layer 503b of the third wavelength band filter 533.

In addition, the third wavelength band filter 533 may overlap with the first alignment key pattern 210 and the third alignment key pattern 230. Further, the third wavelength band filter 533 may overlap with the second alignment key pattern 912 and the fourth alignment key pattern 914.

As mentioned earlier, the first alignment key pattern 210, the second alignment key pattern 912, the third alignment key pattern 230, and the fourth alignment key pattern 914 may be used to check the alignment of the upper base substrate 110 and/or the lower base substrate 120 during the process of manufacturing the liquid-crystal display device 3. As the third wavelength band filter 533 overlapping with the first alignment key pattern 210, the second alignment key pattern 912, the third alignment key pattern 230, and the fourth alignment key pattern 914 transmits at least a part of the light in the green wavelength band and/or red wavelength band, it is possible to prevent a defect in which the locations of the alignment key patterns are not seen or not clearly seen.

Figure 9:
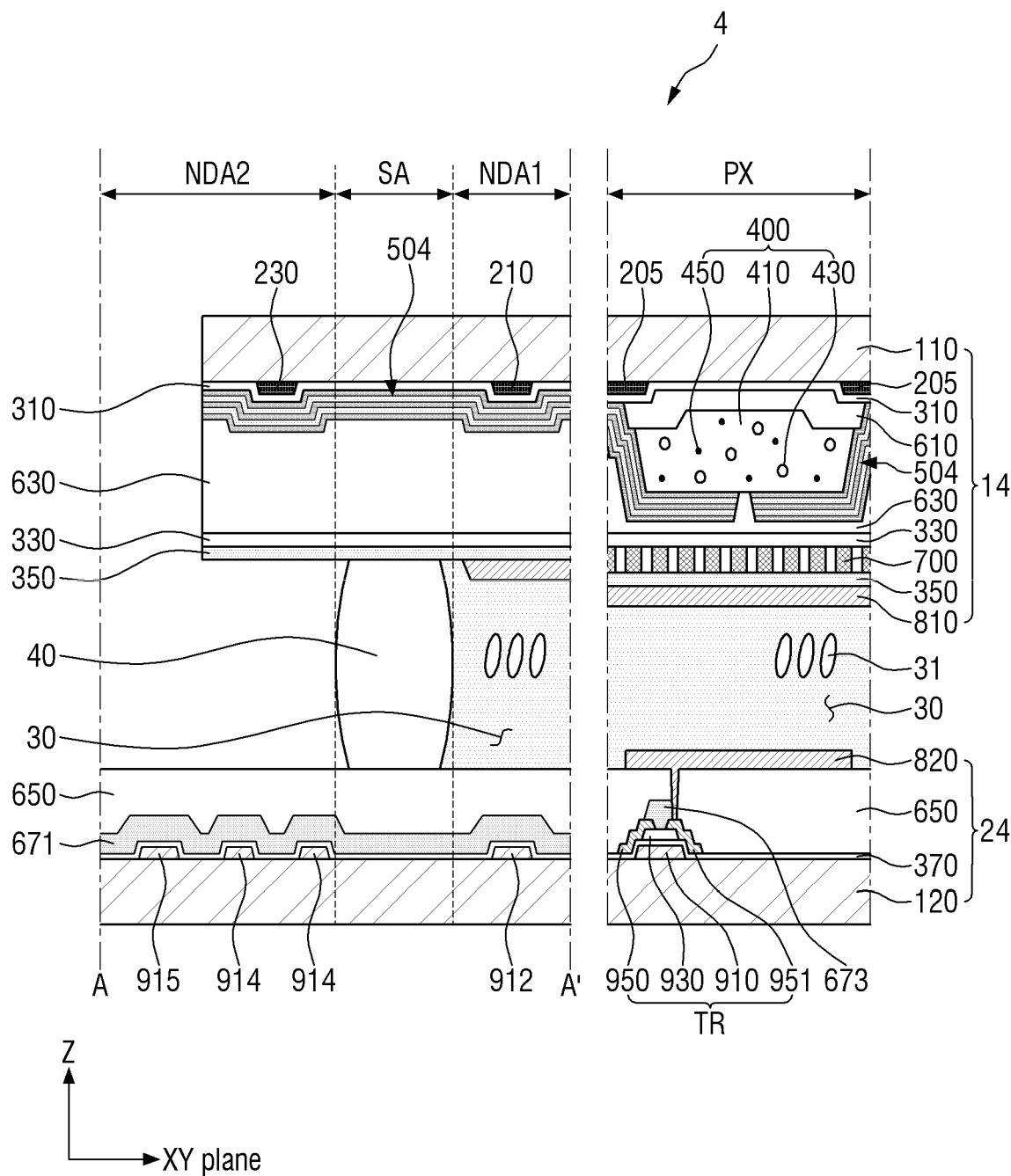

FIG. 9 is a cross-sectional view of a liquid-crystal display device according to yet another exemplary embodiment of the inventive concepts, which corresponds to the cross-sectional view of FIG. 4.

Referring to FIG. 9, the liquid-crystal display device 4 according to this exemplary embodiment is different from the liquid-crystal display device 1 according to the exemplary embodiment shown in FIG. 4 in that a lower substrate 24 of the liquid-crystal display device 4 further includes a second color filter pattern 671.

In an exemplary embodiment, a wavelength band filter 504 may be disposed on the back surface of the upper base substrate 110. The wavelength band filter 504 may be a distributed Bragg reflector that transmits light in the blue wavelength band including a peak wavelength of blue and selectively reflects light having a wavelength longer than blue, e.g., light in the green wavelength band including a peak wavelength of green and/or light in the red wavelength band including a peak wavelength of red. The wavelength band filter 504 may be disposed across the display area DA and the non-display area NDA. That is, the wavelength band filter 504 may overlap with at least one of the first alignment key pattern 210, the second alignment key pattern 912, the third alignment key pattern 230, and the fourth alignment key pattern 914 in the third direction Z.

In addition, a second color filter pattern 671 may be disposed on the lower base substrate 120. The second color filter pattern 671 may be disposed in the non-display area NDA on the front surface of the lower base substrate 120. For example, the second color filter pattern 671 may overlap with the first alignment key pattern 210, the second alignment key pattern 912, the third alignment key pattern 230, the fourth alignment key pattern 914, and the fifth alignment key pattern 915 in the third direction Z. In addition, the second color filter pattern 671 may overlap with the wavelength band filter 504 in the third direction Z.

The absorption wavelength band of the second color filter pattern 671 may at least partially overlap with the reflection wavelength band of the wavelength band filter 504. In an exemplary embodiment, the second color filter pattern 671 may selectively transmit light in the green wavelength band including the peak wavelength of green or light in the red wavelength band including the peak wavelength of red. For example, the second color filter pattern 671 may be a green color filter that selectively transmits only light in the green wavelength band and absorbs light in the other wavelength bands, or a red color filter that selectively transmits only light in the red wavelength band and absorbs light in other wavelength bands. It is, however, to be understood that this is merely illustrative. The second color filter pattern 671 may be a blue color filter pattern that selectively transmits only blue light.

In some embodiments, a third color filter pattern 673 may be further disposed in the display area DA on the lower base substrate 120. For example, the third color filter pattern 673 may be disposed on the switching element TR. Specifically, the third color filter pattern 673 may overlap with the active layer 930 of the switching element TR in the third direction Z.

The third color filter pattern 673 may be disposed on the same layer as the second color filter pattern 671. For example, the second color filter pattern 671 and the third color filter pattern 673 may include the same material and may have substantially the same transmission wavelength band and substantially the same absorption wavelength band. In addition, the second color filter pattern 671 and the third color filter pattern 673 may be simultaneously formed through a single process.

The liquid-crystal display device 4 according to this exemplary embodiment may include a wavelength band filter 504 and a second color filter pattern 671 overlapping with each other, and the absorption wavelength band of the second color filter pattern 671 may overlap with the reflection wavelength band of the wavelength band filter 504 at least partially. For example, the white light incident from the lower substrate 24, that is, from the lower side of FIG. 9, firstly transmits the second color filter pattern 671 (for example, the red color filter pattern) so that the green wavelength band and the blue wavelength band can be absorbed. In this manner, at least a part of the green wavelength band is absorbed by the second color filter pattern 671 so that the amount of light reflected by the wavelength band filter 504 can be reduced. The third color filter pattern 673 (for example, the red color filter pattern) overlapping with the active layer 930 of the switching element TR may absorb light in the green wavelength band and the blue wavelength band of the light incident on the active layer 930. In this manner, it is possible to prevent the active layer 930 from being damaged by short-wavelength light.

Hereinafter, a method of manufacturing a liquid-crystal display device according to an exemplary embodiment of the present disclosure will be described.

FIG. 10 to FIG. 16 are cross-sectional views illustrating a method of manufacturing a liquid-crystal display device according to an exemplary embodiment of the present disclosure, which corresponds to FIG. 4.

Figure 10:
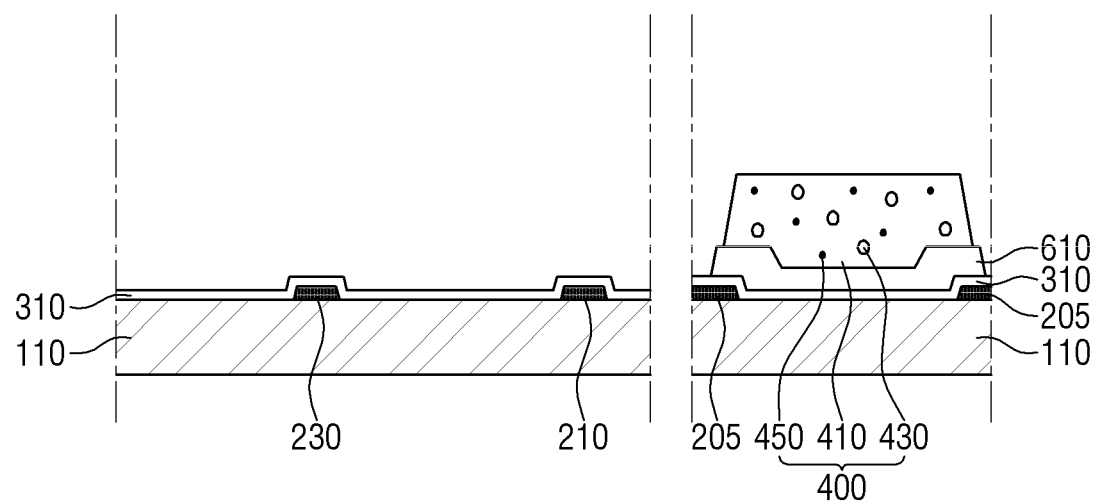
FIG. 10, FIG. 11, FIG. 12, FIG. 13, FIG. 14, FIG. 15, and FIG. 16 are cross-sectional views for illustrating processes of a method of manufacturing a liquid-crystal display device according to an exemplary embodiment of the inventive concepts.

Referring first to FIG. 10, a plurality of alignment key patterns 210 and 230 and a light-blocking pattern 205 are formed on a first base substrate 110, and a first protective layer 310, a color filter pattern 610, and a color conversion pattern 400 may be formed on the alignment key patterns 210 and 230 and the light-blocking pattern 205.

The plurality of alignment key patterns 210 and 230 may include a first alignment key pattern 210 located more toward the inside, and a third alignment key pattern 230 located more toward the outside than the first alignment key pattern 210. In the exemplary embodiment, the first alignment key pattern 210, the third alignment key pattern 230, and the light-blocking pattern 205 may include the same material and may be formed simultaneously through a single process.

Figure 11:
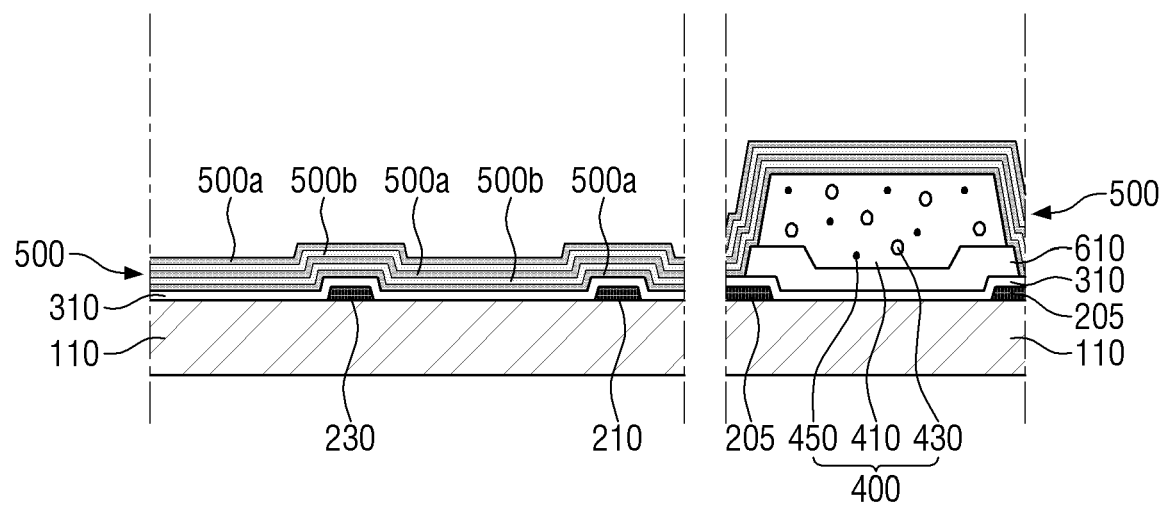

Subsequently, referring to FIG. 11, a wavelength band filter 500 is formed on the color conversion pattern 400. As described above, the wavelength band filter 500 may be a wavelength-selective reflector that transmits light in a particular wavelength band and reflects light in other wavelength bands. For example, the wavelength band filter 500 may be a distributed Bragg reflector that transmits light in the blue wavelength band including a peak wavelength of blue and selectively reflects light having a wavelength longer than blue, e.g., light in the green wavelength band including a peak wavelength of green and/or light in the red wavelength band including a peak wavelength of red.

The wavelength band filter 500 may include a plurality of layers 500a and 500b stacked one on another. For example, the wavelength band filter 500 may include at least one first inorganic layer 500a and at least one second inorganic layer 500b alternately stacked one on another. The second inorganic layer 500b may have a refractive index smaller than that of the first inorganic layer 500a and may be made of a material different from that of the first inorganic layer 500a. As a non-limiting example, each of the bottom layer of the wavelength band filter 500 in contact with the color conversion pattern 400 and the topmost layer of the wavelength band filter 500 may be the first inorganic layer 500a having a relatively high refractive index.

Subsequently, referring to FIGS. 12 and 13, a portion of the wavelength band filter 501 overlapping with the plurality of alignment key patterns 210 and 230 is partially patterned, and a portion of the wavelength band filter 501 overlapping with the color conversion pattern 400 is patterned.

Figure 12:
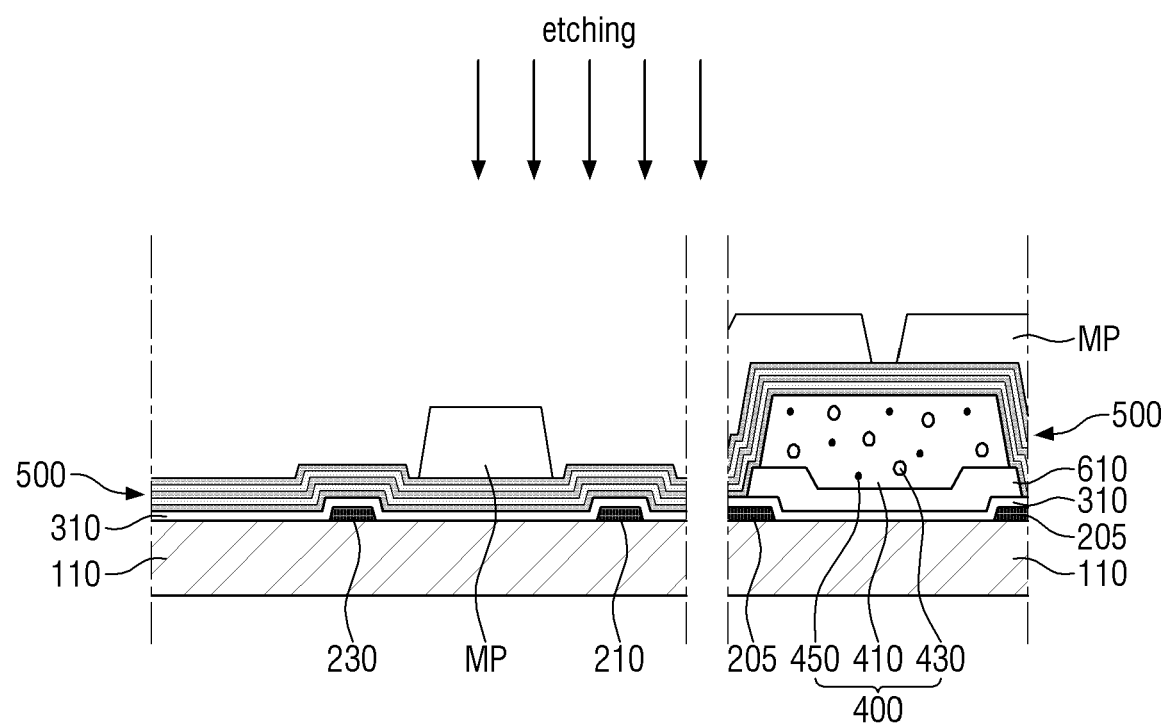
Figure 13:
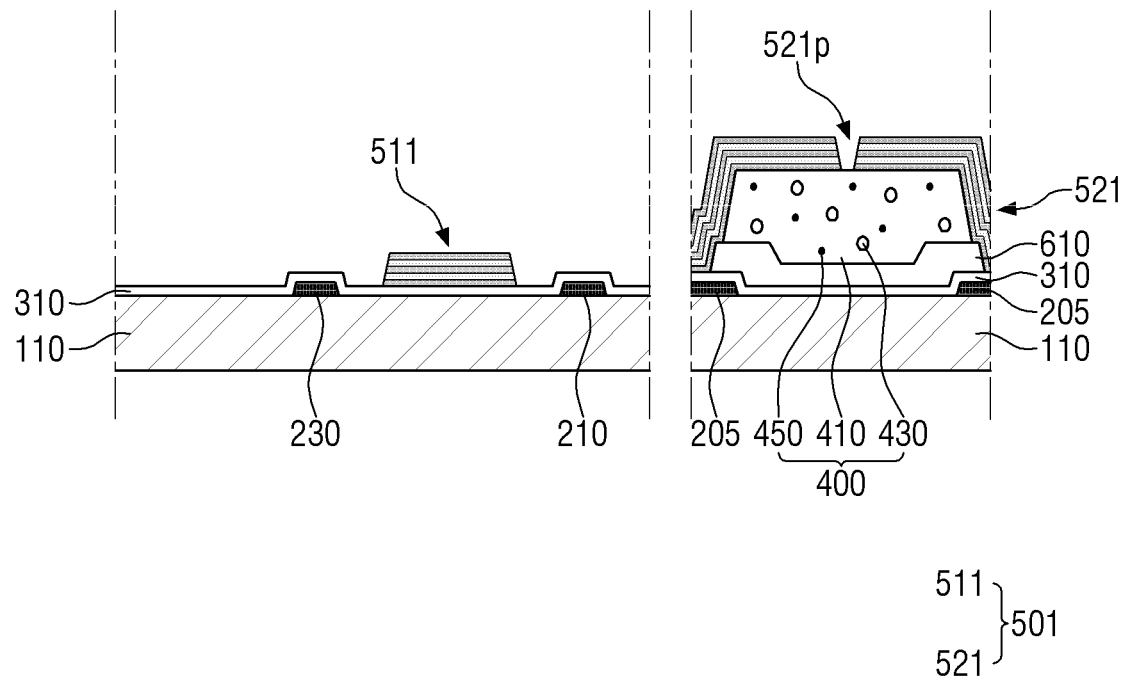

Specifically, referring to FIG. 12, a mask pattern MP is formed on the wavelength band filter 500. In an exemplary embodiment, the mask pattern MP may be formed such that it overlaps with none of the first alignment key pattern 210 and the third alignment key pattern 230. The mask pattern MP may be formed on the color conversion pattern 400 and may have an opening overlapping with the color conversion pattern 400.

Subsequently, referring to FIGS. 12 and 13, the wavelength band filter 501 is patterned using the mask pattern MP as an etching mask.

In an exemplary embodiment, a portion of the wavelength band filter that is not covered by the mask pattern MP may be partially removed. For example, the portion of the wavelength band filter overlapping with the first and the third alignment key patterns 210 and 230 are partially removed to form the first wavelength band filter 511 that overlaps with none of the first alignment key pattern 210 and the third alignment key pattern 230, such that the first protective layer 310 may be exposed. An opening 521p may be formed in the second wavelength band filter 521 overlapping with the color conversion pattern 400, such that the color conversion pattern 400 may be partially exposed.

The method of manufacturing the liquid-crystal display device according to the exemplary embodiment can form the first wavelength band filter 511 that overlaps with none of the first alignment key pattern 210 and the third alignment key pattern 230 as well as the second wavelength band filter 521 having the opening 521p overlapping with the color conversion pattern 400 simultaneously through a single etching process.

Figure 14:
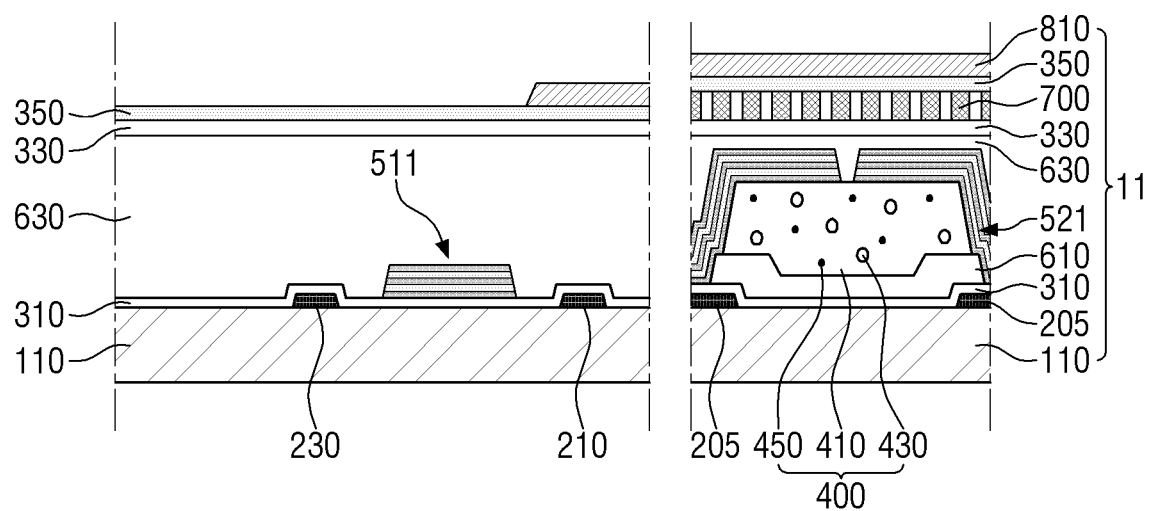

Subsequently, referring to FIG. 14, an overcoating layer 630, a second protective layer 330, a wire grid pattern 700, a third protective layer 350, and a common electrode 810 are formed on the color conversion pattern 400, to prepare a first substrate 11. The overcoating layer 630, the second protective layer 330, the wire grid pattern 700, the third protective layer 350, and the common electrode 810 have been described above; and, therefore, the redundant description will be omitted.

Figure 15:
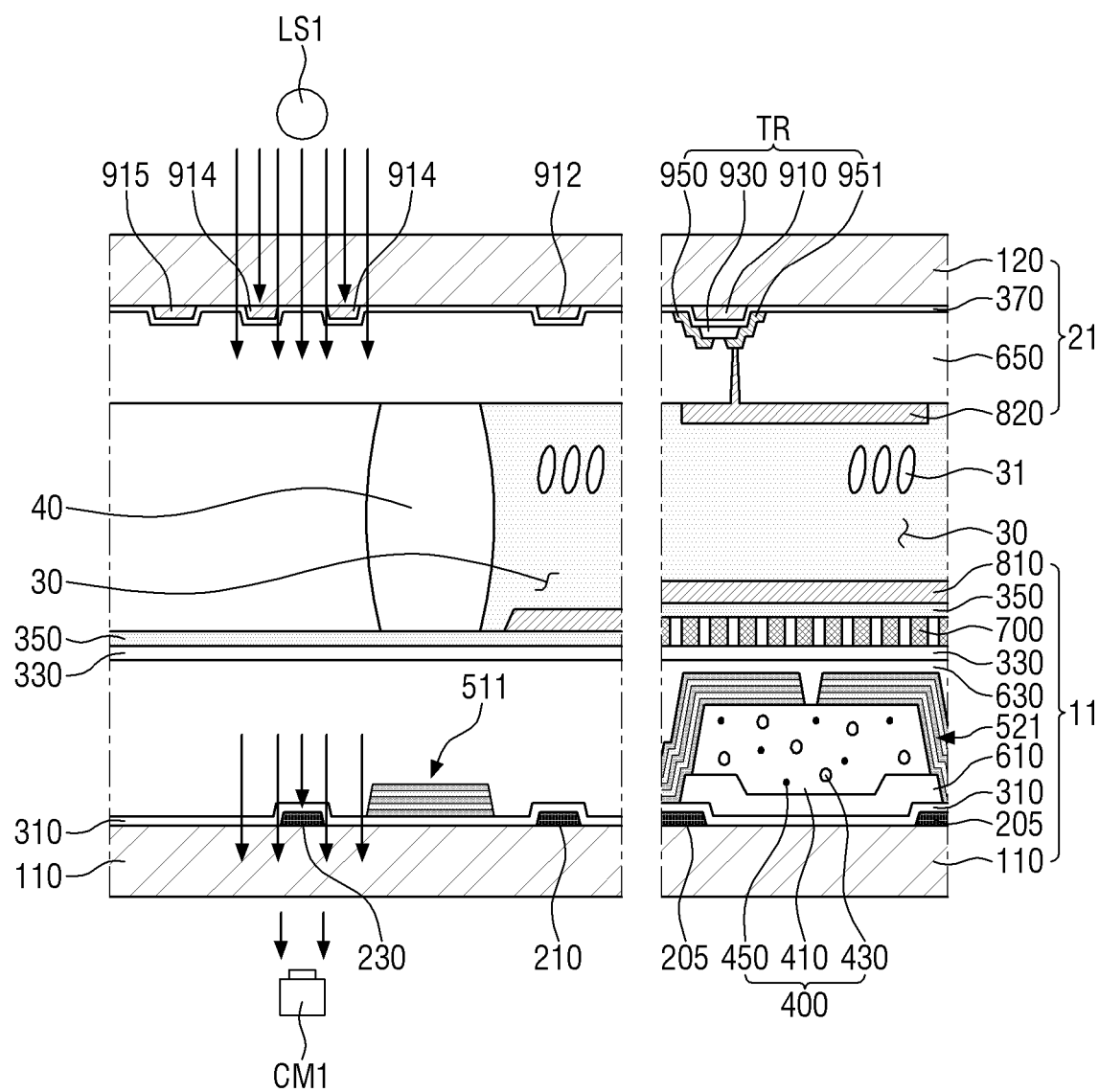

Subsequently, referring first to FIG. 15, a second substrate 21 is prepared, which includes a second base substrate 120, a switching element TR, a plurality of alignment key patterns 912, 914, and 915, an intermediate layer 650 and a pixel electrode 820. The first substrate 11 and the second substrate 21 are attached together to form a liquid-crystal layer 30 therebetween.

In an exemplary embodiment, the attaching the first substrate 11 and the second substrate 21 together may include providing a sealing member 40 on the first substrate 11, aligning the first substrate 11 with the second substrate 21, attaching the first substrate 11 and the second substrate 21 with each other using the sealing member 40.

The plurality of alignment key patterns 912, 914, and 915 of the second substrate 21 may include the second alignment key pattern 912 located more toward the inside, the fourth alignment key pattern 914 located more toward the outside than the second alignment key pattern 912, and the fifth alignment key pattern 915 located more toward the outside than the fourth alignment key pattern 914. The second alignment key pattern 912, the fourth alignment key pattern 914, and the fifth alignment key pattern 915 may include, but is not limited to, the same material as the gate 910 of the switching element TR and may be formed through a single process simultaneously.

The sealing member 40 may be provided between the first alignment key pattern 210 and the third alignment key pattern 230 and between the second alignment key pattern 912 and the fourth alignment key pattern 914.

In some embodiments, the aligning the first substrate 11 with the second substrate 21 may be performed by using the third alignment key pattern 230 and the fourth alignment key pattern 914 that are located more toward the outside than the sealing member 40 and are aligned with each other. For example, the aligning the first substrate 11 and the second substrate 21 may include irradiating light from the fourth alignment key pattern 914, that is, from the second substrate 21 side, and checking whether the first substrate 11 and the second substrate 21 are aligned by sensing light transmitted to the third alignment key pattern 230, i.e., the first substrate 11 side.

In an exemplary embodiment in which the fourth alignment key pattern 914 has an opening conforming to the third alignment key pattern 230, the straight light irradiated from the fourth alignment key pattern 914 side may be partially blocked by the fourth alignment key pattern 914 and the third alignment key pattern 230. In this manner, a sensing unit CM1 disposed on the side of the third alignment key pattern 230 can sense a specific image taken by aligning the third alignment key pattern 230 with the fourth alignment key pattern 914, and it can be determined whether the first substrate 11 and the second substrate 21 are aligned based on the image. The sensing unit CM1 may be, but is not limited to, an image capturing camera.

If a wavelength band filter that reflects light of a specific wavelength band is disposed between the fourth alignment key pattern 914 and the third alignment key pattern 230, at least a part of the light traveling straight from the second substrate 21 toward the first substrate 11 may be reflected back to the second substrate 21. As a result, a problem may arise in which a clear image is not seen at the sensing unit CM1.

In contrast, in the method of manufacturing a liquid-crystal crystal display device according to the exemplary embodiment of the inventive concepts, no wavelength band filter that reflects light of a specific wavelength band is disposed between the fourth alignment key pattern 914 and the third alignment key pattern 230. As a result, a clear image can be observed at the sensing unit CM1 and the alignment of the first substrate 11 and the second substrate 21 can be accurately checked.

Figure 16:
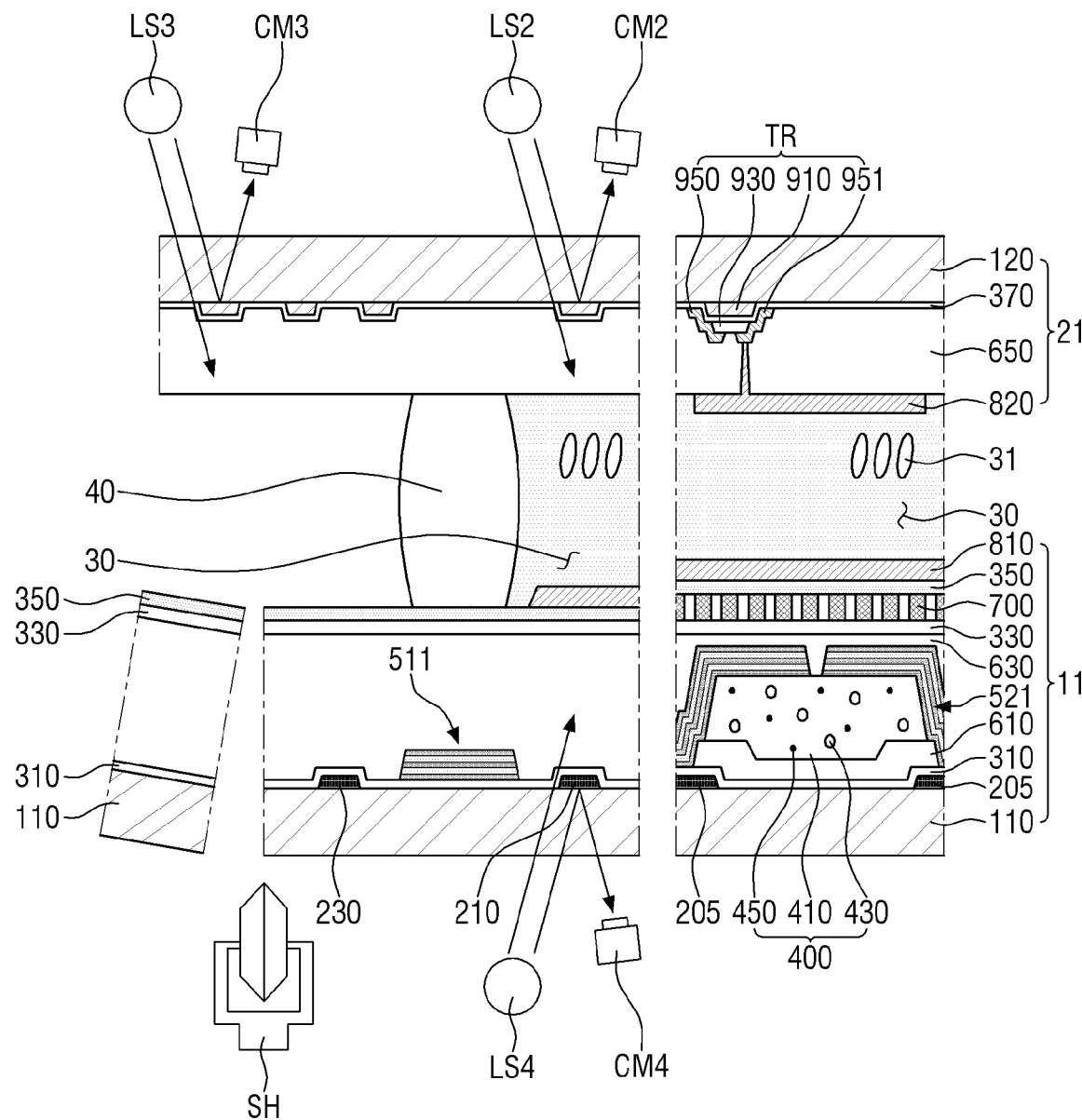

Subsequently, referring to FIG. 16, the positional relationship between the first substrate 11 and the second substrate 21 attached together by the sealing member 40 is checked, and the first substrate 11 is partially removed.

The checking the positional relationship between the first substrate 11 and the second substrate 21 may include checking the positional relationship between the first substrate 11 and the second substrate 21 attached together by the sealing member 40 to align the location of a scribing wheel SH with the first substrate 11 and the second substrate 21. In addition, the partially removing the first substrate 11 may include partially removing the edge of the first substrate 11 using the scribing wheel SH.

The checking the positional relationship between the first substrate 11 and the second substrate 21 may be performed by using the first alignment key pattern 210 and the second alignment key pattern 912 which are located on the inner side of the sealing member 40, or the fifth alignment key pattern 915 located on the outer side of the fourth alignment key pattern 914 and not overlapping with the first substrate 11. In an exemplary embodiment, the checking the positional relationship between the first substrate 11 and the second substrate 21 may include at least one of irradiating light toward the first alignment key pattern 210 to sense light reflected off the first alignment key pattern 210, irradiating light toward the second alignment key pattern 912 to sense light reflected off the second alignment key pattern 912, and irradiating light toward the fifth alignment key pattern 915 to sense light reflected off the fifth alignment key pattern 915.

For example, at least a part of the light irradiated onto the vicinity of the first alignment key pattern 210 may be reflected by the first alignment key pattern 210, and at least part of the light may be transmitted through an area where the first alignment key pattern 210 is not disposed. Accordingly, a sensing unit CM2 disposed on the side of the first alignment key pattern 210 can sense a specific image of the light reflected off the first alignment key pattern 210, and the positional relationship between the first substrate 11 and the second substrate 21 can be checked. The sensing unit CM2 may be, but is not limited to, an image capturing camera.

Likewise, a sensing unit CM3 disposed on the side of the second alignment key pattern 912 can sense a specific image of the light reflected off the second alignment key pattern 912, and a sensing unit CM4 disposed on the side of the fifth alignment key pattern 915 can sense a specific image of the light reflected off the fifth alignment key pattern 915.

If a wavelength band filter is disposed in the vicinity of the first alignment key pattern 210, at least a part of the light irradiated onto the region where the first alignment key pattern 210 is not disposed may be reflected toward the sensing unit CM2. As a result, a problem may arise in which an image of the light reflected off the first alignment key pattern 210 may not be clearly seen at the sensing unit CM2. Similarly, at least a part of the light irradiated onto the vicinity of the second alignment key pattern 912 or the region where the fifth alignment key pattern 915 is not disposed may be reflected toward the sensing units CM3 and CM4. As a result, a problem may arise in which an image of the light reflected off the second alignment key pattern 912 or the fifth alignment key pattern 915 may not be clearly seen at the sensing units CM3 and CM4.

In contrast, in the method of manufacturing a liquid-crystal crystal display device according to the exemplary embodiment of the present disclosure, no wavelength band filter is disposed which may cause reflection of light irradiated toward the first alignment key pattern 210, the second alignment key pattern 912 and the fifth alignment key pattern 915. As a result, light reflected off the first alignment key pattern 210, the second alignment key pattern 912, or the fifth alignment key pattern 915 can be clearly seen, and the positional relationship between the first substrate 11 and the second substrate can be accurately checked.

Hereinafter, a method of manufacturing a liquid-crystal display device according to another exemplary embodiment of the present disclosure will be described.

FIG. 17 to FIG. 22 are cross-sectional views illustrating a method of manufacturing a liquid-crystal display device according to an exemplary embodiment of the inventive concepts, which corresponds to FIG. 7.

Figure 17:
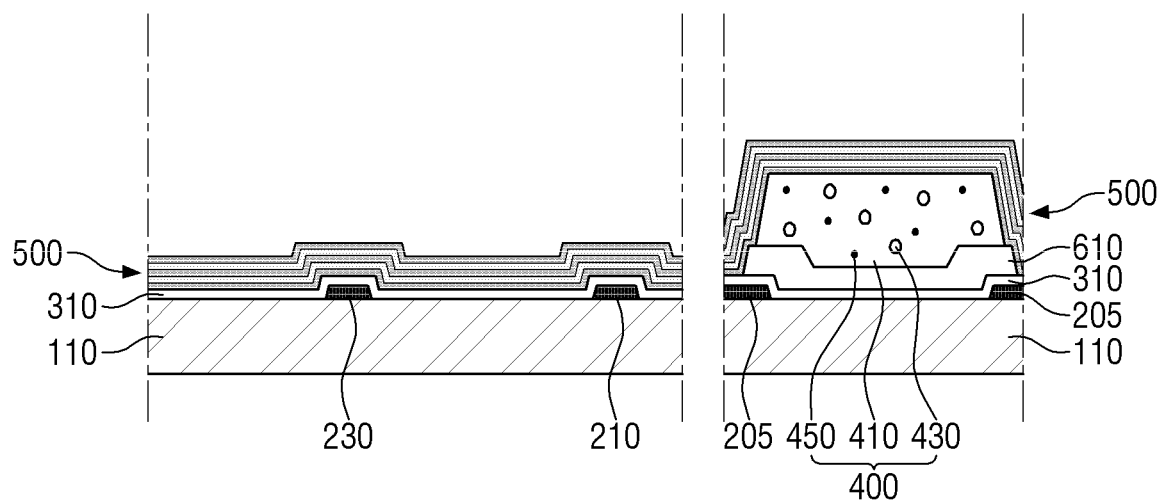

Referring first to FIG. 17, a plurality of alignment key patterns 210 and 230 and a light-blocking pattern 205 are formed on a first base substrate 110, and a first protective layer 310, a color filter pattern 610, a color conversion pattern 400, and a wavelength band filter 500 may be formed.

Subsequently, referring to FIGS. 18 and 19, a portion of the wavelength band filter 533 overlapping with the plurality of alignment key patterns 210 and 230 is partially patterned, and a portion of the wavelength band filter 523 overlapping with the color conversion pattern 400 is patterned.

Figure 18:
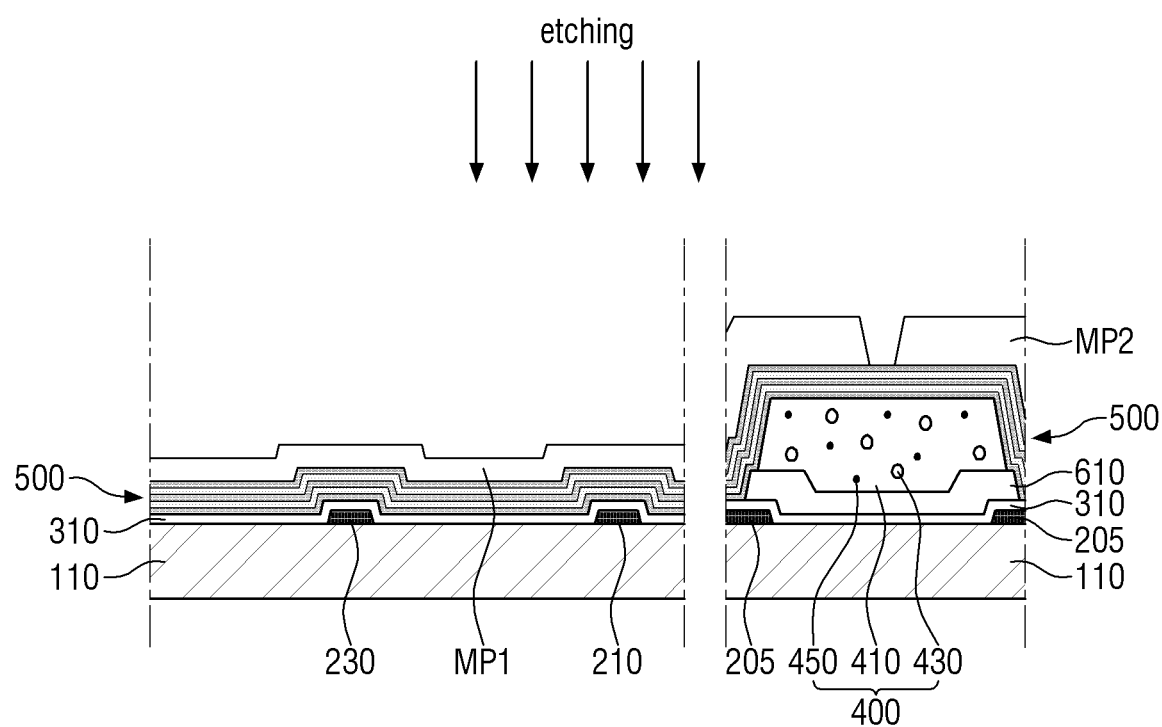
Figure 19:
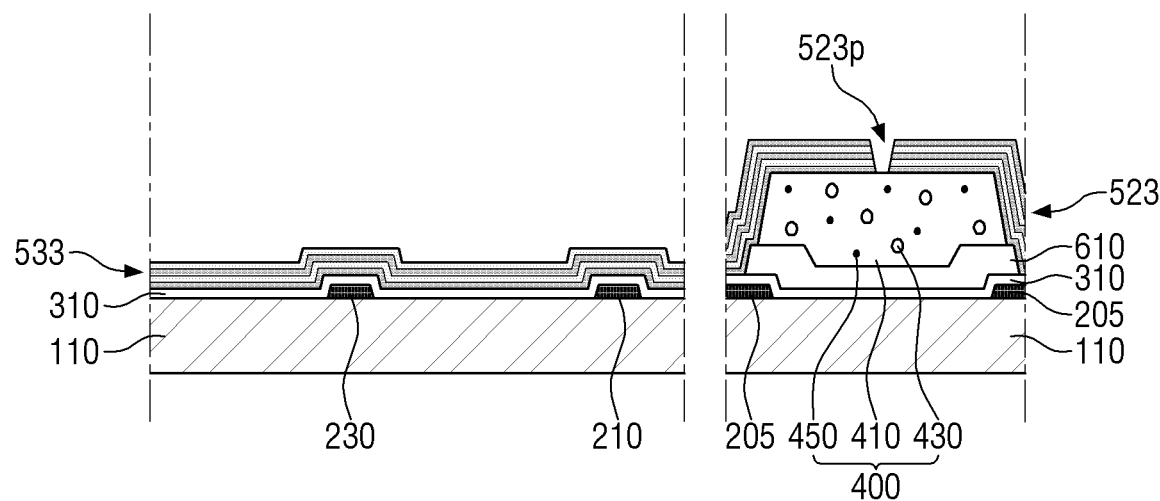

Specifically, referring to FIG. 18, mask patterns MP1 and MP2 are formed on the wavelength band filter 500. In an exemplary embodiment, the first mask pattern MP1 may be formed such that it overlaps with the first alignment key pattern 210 and the third alignment key pattern 230. The second mask pattern MP2 may be formed on the color conversion pattern 400 and may have an opening overlapping with the color conversion pattern 400. In addition, the thickness of a portion of the first mask pattern MP1 overlapping with the first alignment key pattern 210 and the third alignment key pattern 230 may be less than the thickness of a portion of the second mask pattern MP2 overlapping with the color conversion pattern 400.

Subsequently, referring to FIGS. 18 and 19, the wavelength band filters 523 and 533 are patterned using the mask patterns MP1 and MP2 as etching masks.

In an exemplary embodiment, a portion of the wavelength band filter that is not covered by the mask patterns MP1 and MP2 may be removed. For example, an opening 523p may be formed in the second wavelength band filter 523 overlapping with the color conversion pattern 400, such that the color conversion pattern 400 may be partially exposed.

In addition, the upper portion of the wavelength band filter overlapping with the first alignment key pattern 210 and the third alignment key pattern 230 may be partially removed, to form the third wavelength band filter 533. That is, the third wavelength band filter 533 may be patterned so that it is thinner than the second wavelength band filter 523. In this manner, the reflection wavelength band of the third wavelength band filter 533 overlapping with the first alignment key pattern 210 and the third alignment key pattern 230 may be different from the reflection wavelength band of the second wavelength band filter 523 overlapping with the color conversion pattern 400. That is, the reducing the thickness by the patterning may include forming a distributed Bragg reflector (e.g., a second reflector) having a different reflection wavelength band from the dispersed Bragg reflector (e.g., a first reflector) before the thickness is reduced.

The method of manufacturing the liquid-crystal display device according to the exemplary embodiment can control the reflection wavelength band of a portion of the third wavelength band filter 533 overlapping with the first alignment key pattern 210 and the third alignment key pattern 230 through a single etching process, and can form the second wavelength band filter 523 having the opening 523p overlapping with the color conversion pattern 400 simultaneously.

Figure 20:
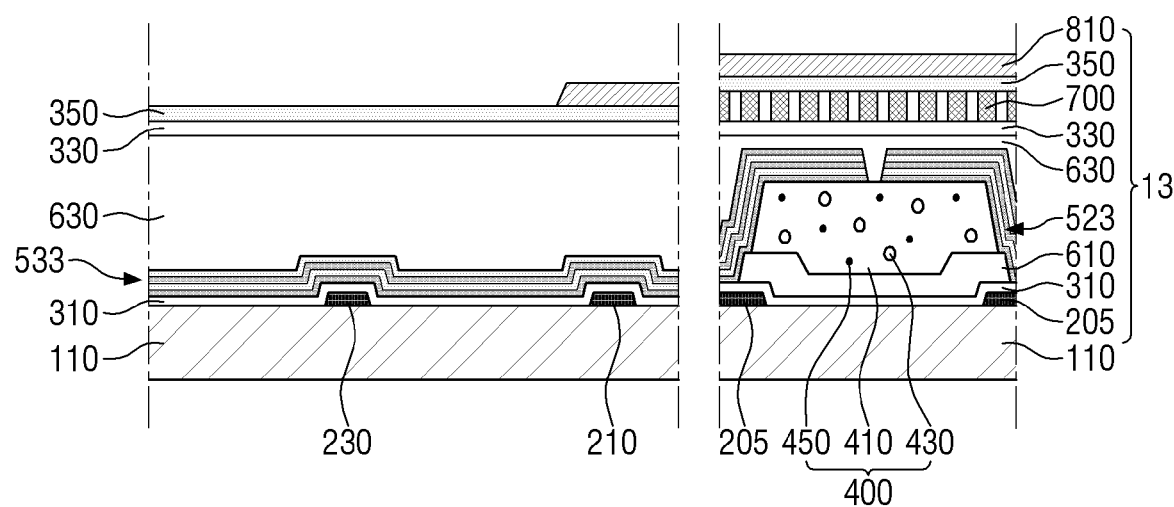

Subsequently, referring to FIG. 20, an overcoating layer 630, a second protective layer 330, a wire grid pattern 700, a third protective layer 350, and a common electrode 810 are formed on the color conversion pattern 400, to prepare a first substrate 13. The overcoating layer 630, the second protective layer 330, the line grid pattern 700, the third protective layer 350, and the common electrode 810 have been described above; and, therefore, any redundant description will be omitted.

Figure 21:
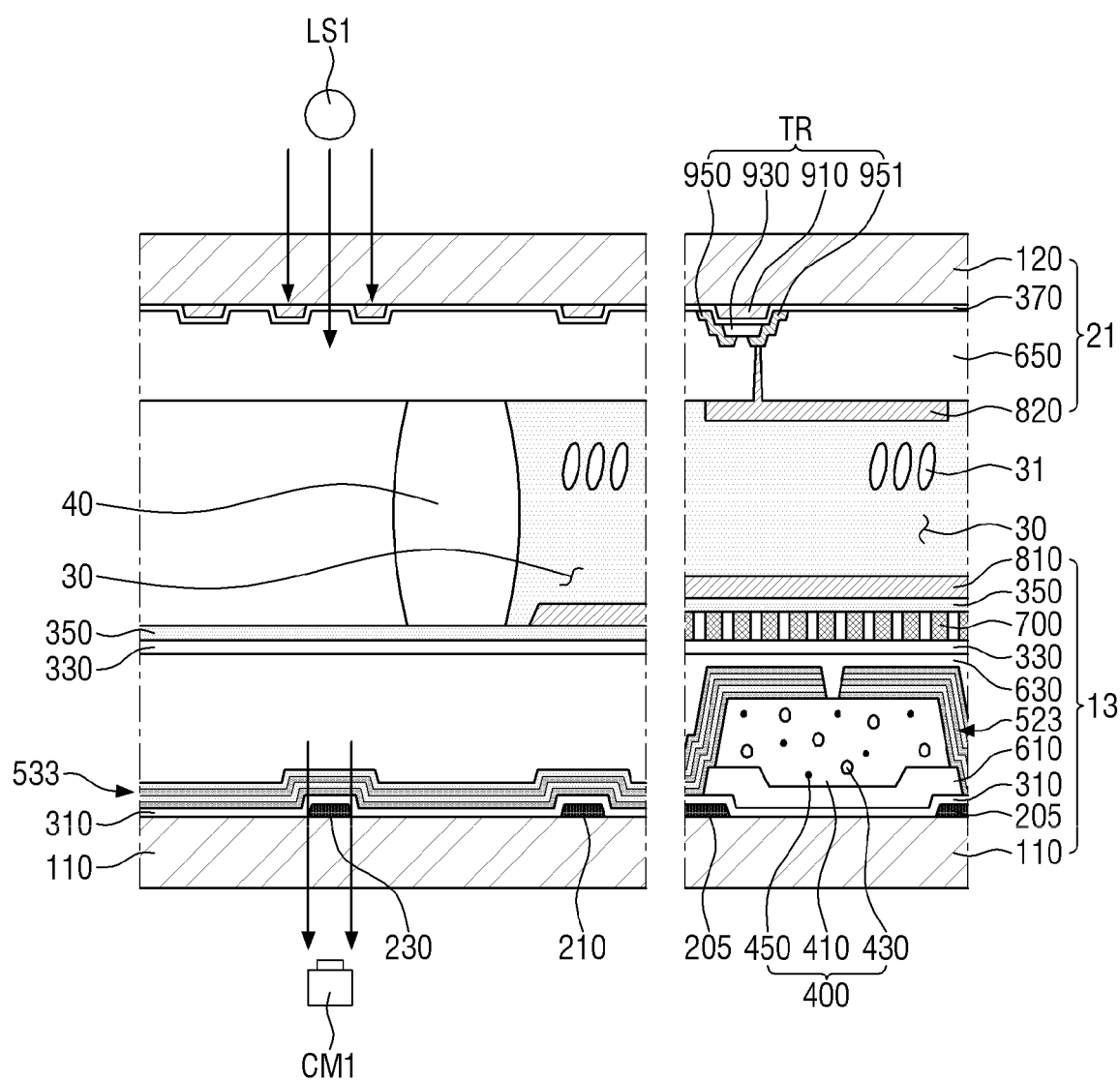

Subsequently, referring first to FIG. 21, a second substrate 21 is prepared, which includes a second base substrate 120, a switching element TR, a plurality of alignment key patterns 912, 914 and 915, an intermediate layer 650, and a pixel electrode 820. The first substrate 13 and the second substrate 21 are attached together to form a liquid-crystal layer 30 therebetween.

In an exemplary embodiment, the attaching the first substrate 13 and the second substrate 21 together may include providing a sealing member 40 on the first substrate 13, aligning the first substrate 13 with the second substrate 21, attaching the first substrate 13 and the second substrate 21 with each other using the sealing member 40.

The method of manufacturing a liquid-crystal display device according to this exemplary embodiment can reduce reflected light by the third wavelength band filter 533 disposed between the fourth alignment key pattern 914 and the third alignment key pattern 230. Accordingly, a clear image can be seen at the sensing unit CM1, and the alignment of the first substrate 13 and the second substrate 21 can be accurately checked.

Aligning the first substrate 13 with the second substrate 21 has been described above. Therefore, any redundant description will be omitted.

Subsequently, referring to FIG. 22, the positional relationship between the first substrate 13 and the second substrate 21 attached together by the sealing member 40 is checked, and the first substrate 13 is partially removed.

In the method of manufacturing a liquid-crystal crystal display device according to an exemplary embodiment of the inventive concepts, the reflection of the light by the third wavelength band filter 533 that is irradiated toward the first alignment key pattern 210, the second alignment key pattern 912, and the fifth alignment key pattern 915 can be reduced. As a result, light reflected off the first alignment key pattern 210, the second alignment key pattern 912, or the fifth alignment key pattern 915 can be clearly seen, and the positional relationship between the first substrate 13 and the second substrate can be accurately checked.

Checking the positional relationship between the first substrate 13 and the second substrate 21 has been described above; and, therefore, the redundant description will be omitted.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device having a display area and a non-display area surrounding the display area defined therein, the device comprising:
   a first substrate; and
   a second substrate disposed above the first substrate,
   wherein:
   the first substrate comprises:
   a first base substrate,
   a first wavelength band filter disposed on the first base substrate in the non-display area; and
   a second wavelength band filter disposed on the first base substrate in the display area;
   each of the first wavelength band filter and the second wavelength band filter is a wavelength-selective reflector; and
   a reflection wavelength band of the first wavelength band filter is at least partially different from a reflection wavelength band of the second wavelength band filter.

2. The display device of claim 1, wherein:
   each of the first wavelength band filter and the second wavelength band filter comprises a plurality of inorganic layers stacked on one another alternately;
   a total thickness of the first wavelength band filter is different from a total thickness of the second wavelength band filter; and
   the first wavelength band filter and the second wavelength band filter share at least a part of the inorganic layers.

3. The display device of claim 1, wherein:
   the first substrate further comprises an overcoating layer disposed on the first wavelength band filter and the second wavelength band filter;
   each of the first wavelength band filter and the second wavelength band filter comprises a first inorganic layer and a second inorganic layer alternately stacked one on another, the second inorganic layer having a refractive index smaller than a refractive index of the first inorganic layer;
   a topmost layer of the first wavelength band filter in contact with the overcoating layer is the second inorganic layer; and
   a topmost layer of the second wavelength band filter in contact with the overcoating layer is the first inorganic layer.

4. The display device of claim 1, wherein the second substrate comprises:
   a second base substrate; and
   a first color filter pattern disposed on the second base substrate and overlapping with the first wavelength band filter,
   wherein a reflection wavelength band of the first wavelength band filter at least partially overlaps with an absorption wavelength band of the first color filter pattern.

5. The display device of claim 4, wherein the second substrate further comprises:
- a thin-film transistor disposed in the display area on the second base substrate; and
- a second color filter pattern disposed on the thin-film transistor, overlapping with the thin-film transistor, and having a same transmission wavelength band as that of the first color filter pattern.

6. The display device of claim 4, wherein:
- the first substrate further comprises an alignment key pattern overlapping with the first wavelength band filter and the first color filter pattern; and
- the reflection wavelength band of the first wavelength band filter is substantially the same as the reflection wavelength band of the second wavelength band filter.

7. The display device of claim 1, further comprising a sealing member that attaches the first substrate and the second substrate together and is disposed in the non-display area,
wherein:
- the first substrate further comprises a first alignment key pattern disposed on the first base substrate in the non-display area and on an inner side of the sealing member; and
- the second substrate comprises a second alignment key pattern at least partially overlapping with the first alignment key pattern on the second base substrate.

8. The display device of claim 7, wherein the first substrate further comprises a light-blocking pattern disposed in the display area on the first base substrate, disposed on a boundary between adjacent pixels, and comprising a same material as the first alignment key pattern.

9. The display device of claim 8, wherein:
- the first substrate further comprises a third alignment key pattern disposed on the first base substrate in the non-display area and disposed on an outer side of the sealing member; and
- the second substrate further comprises a fourth alignment key pattern disposed on the second base substrate in the non-display area, disposed on the outer side of the sealing member, and aligned with the third alignment key pattern.

10. The display device of claim 9, wherein:
- an area of the second substrate is larger than an area of the first substrate when viewed from a top; and
- the second substrate further comprises a fifth alignment key pattern that does not overlap with the first substrate and comprises a same material as the second alignment key pattern.

11. A display device having a display area and a non-display area surrounding the display area defined therein, the device comprising:
- a first substrate; and
- a second substrate disposed above the first substrate,
wherein:
the first substrate comprises:
- a first base substrate,
- a first wavelength band filter disposed on the first base substrate in the non-display area;
- a second wavelength band filter disposed on the first base substrate in the display area; and
- a color conversion pattern disposed between the first base substrate and the second wavelength band filter, overlapping with the second wavelength band filter, and in contact with the second wavelength band filter;
the second wavelength band filter has an opening partially exposing the color conversion pattern; and
the second wavelength band filter comprises a plurality of inorganic layers stacked one on another, and side surfaces of the inorganic layers are exposed through the opening.

12. The display device having a display area and a non-display area surrounding the display area defined therein, the device comprising:
- a first substrate; and
- a second substrate disposed above the first substrate,
wherein:
the first substrate comprises:
- a base substrate;
- a color conversion pattern disposed on the base substrate in the display area;
- a wavelength-selective reflector disposed on the color conversion pattern; and
- an alignment key pattern disposed on the base substrate in the non-display area; and
the wavelength-selective reflector does not overlap with the alignment key pattern.

13. The display device of claim 12, further comprising a sealing member that attaches the first substrate and the second substrate, is disposed in the non-display area, and partially overlaps with the wavelength-selective reflector.

14. The display device of claim 1, further comprising a liquid-crystal layer interposed between the first substrate and the second substrate.

15. The display device of claim 12, further comprising a liquid-crystal layer interposed between the first substrate and the second substrate.

* * * * *